US012743758B2

(12) United States Patent
Park et al.

(10) Patent No.: US 12,743,758 B2
(45) Date of Patent: Sep. 22, 2026

(54) DISPLAY DEVICE FOR SUPPORTING IMAGE ADJUSTMENT AND CONTROL METHOD THEREOF

(71) Applicant: Samsung Electronics Co., Ltd., Suwon-si (KR)

(72) Inventors: Jaesung Park, Suwon-si (KR); Jongho Kim, Suwon-si (KR); Younghoon Jeong, Suwon-si (KR); Youngsu Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/601,165

(22) Filed: Mar. 11, 2024

(65) Prior Publication Data

US 2024/0394858 A1 Nov. 28, 2024

Related U.S. Application Data

(63) Continuation of application No. PCT/KR2024/095386, filed on Feb. 19, 2024.

(30) Foreign Application Priority Data

May 25, 2023 (KR) ........................ 10-2023-0067650

(51) Int. Cl.

*G06T 5/92* (2024.01)
*G06T 5/60* (2024.01)
*G06T 5/73* (2024.01)

(52) U.S. Cl.

CPC .................. *G06T 5/92* (2024.01); *G06T 5/60* (2024.01); *G06T 5/73* (2024.01);

(Continued)

(58) Field of Classification Search

None

See application file for complete search history.

(56) References Cited

U.S. PATENT DOCUMENTS 8,520,023 B2 8/2013 Sullivan
9,418,622 B2 8/2016 Sullivan (Continued)

FOREIGN PATENT DOCUMENTS

CN 106575497 4/2017
JP 2021-197018 12/2021

(Continued)

OTHER PUBLICATIONS

Extended European Search Report dated Oct. 20, 2025 issued in European Patent Application No. 24811453.0.

(Continued)

*Primary Examiner* — Anand P Bhatnagar
(74) *Attorney, Agent, or Firm* — Nixon & Vanderhye P.C.

(57) ABSTRACT

The disclosure discloses an image processing method. The image processing method according to the disclosure may comprise: identifying preferred intensity information indicating a first preferred intensity among a plurality of preferred intensities associated with image processing based on a low vision mode, based on an input, obtaining edge thickness setting information corresponding to the first preferred intensity from the memory and perform edge thickness adjustment processing on an input image based on the obtained edge thickness setting information, obtaining image quality adjustment setting information corresponding to the first preferred intensity from the memory and performing image quality adjustment processing on the image on which the edge thickness adjustment processing is performed based on the obtained image quality adjustment setting information.

20 Claims, 23 Drawing Sheets

(52) U.S. Cl.
CPC ............... *G06T 2207/10024* (2013.01); *G06T 2207/20081* (2013.01); *G06T 2207/20192* (2013.01); *G06T 2207/20208* (2013.01)

(56) References Cited

U.S. PATENT DOCUMENTS

| | | | | |
|---|---|---|---|---|
| 10,170,081 | B2 | 1/2019 | Kageyama et al. | |
| 10,443,817 | B2 * | 10/2019 | Yoneyama | G02F 1/134309 |
| 10,923,076 | B2 * | 2/2021 | Suzuki | G09G 3/002 |
| 11,069,286 | B2 * | 7/2021 | Tan | G09G 3/3225 |
| 11,128,909 | B2 | 9/2021 | Cho et al. | |
| 11,160,688 | B2 | 11/2021 | Cho et al. | |
| 11,195,261 | B2 | 12/2021 | Nam et al. | |
| 11,409,375 | B2 * | 8/2022 | Wang | G06F 3/0317 |
| 11,928,799 | B2 * | 3/2024 | Chopra | H04N 23/73 |
| 12,457,319 | B2 * | 10/2025 | Min | G06T 7/0002 |
| 12,506,857 | B2 * | 12/2025 | Suzuki | G02B 27/0172 |
| 2006/0290712 | A1 * | 12/2006 | Hong | G09G 5/00 348/E5.073 |
| 2010/0182350 | A1 * | 7/2010 | Fujine | H04N 21/4318 345/690 |
| 2014/0321731 | A1 * | 10/2014 | Bryll | G06T 7/0004 382/152 |
| 2015/0213586 | A1 * | 7/2015 | Koike | G06T 5/90 382/284 |
| 2017/0140734 | A1 * | 5/2017 | Kageyama | G09G 5/02 |
| 2017/0213507 | A1 * | 7/2017 | Lin | G09G 3/34 |
| 2017/0360295 | A1 | 12/2017 | Oz et al. | |
| 2018/0174281 | A1 | 6/2018 | Smith | |
| 2023/0216997 | A1 | 7/2023 | Aoki et al. | |

FOREIGN PATENT DOCUMENTS

| | | |
|---|---|---|
| KR | 10-2008-0046855 | 5/2008 |
| KR | 20080046855 A | 5/2008 |
| KR | 10-2018-0051772 | 5/2018 |
| KR | 10-2018-0052501 | 5/2018 |
| KR | 10-2019-0016868 | 2/2019 |
| KR | 102062847 B1 | 1/2020 |
| KR | 10-2023-0009806 | 1/2023 |

OTHER PUBLICATIONS

International Search Report and Written Opinion issued on May 22, 2024 in International Patent Application No. PCT/KR2024/095386.

European Office Action dated May 20, 2026 for EP Application No. 24811453.0.

* cited by examiner

FIG.6
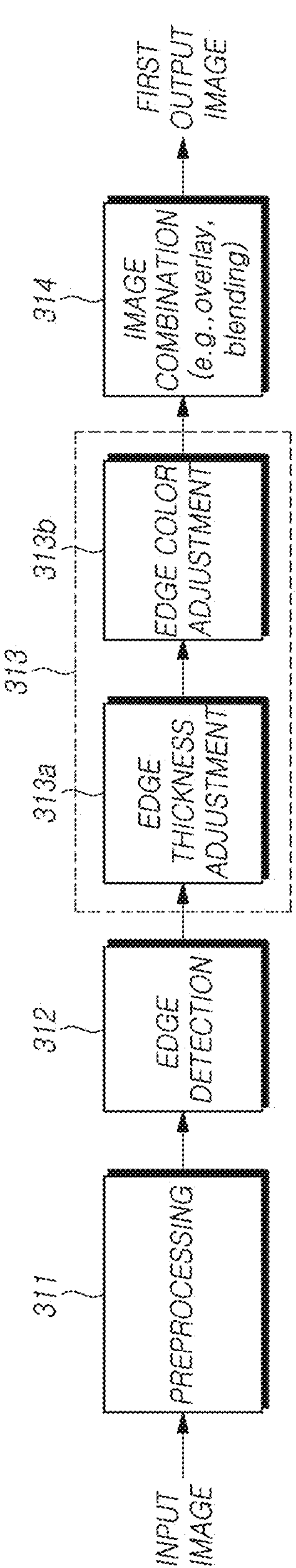
INPUT IMAGE
311
PREPROCESSING
312
EDGE DETECTION
313
313a
EDGE THICKNESS ADJUSTMENT
313b
EDGE COLOR ADJUSTMENT
314
IMAGE COMBINATION (e.g., overlay, blending)
FIRST OUTPUT IMAGE

FIG. 11A

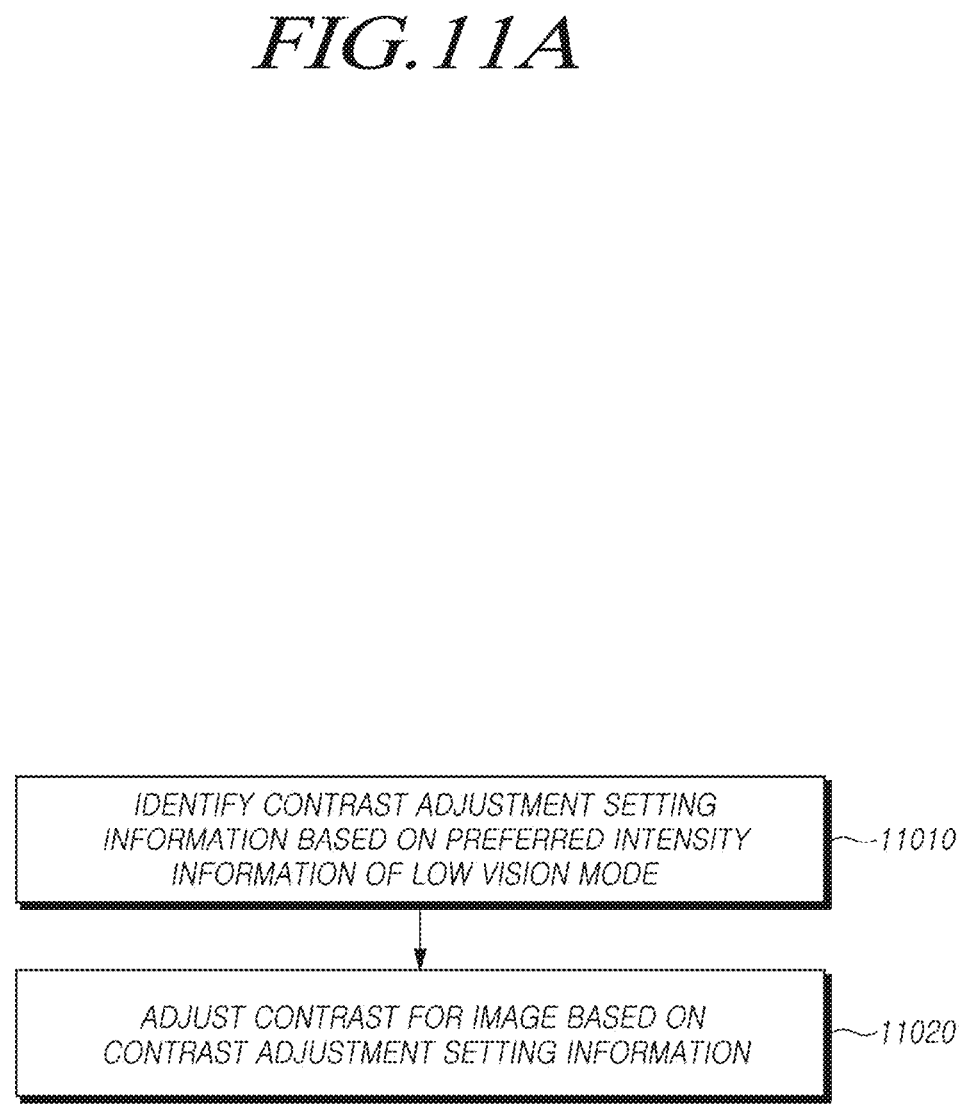

IDENTIFY CONTRAST ADJUSTMENT SETTING INFORMATION BASED ON PREFERRED INTENSITY INFORMATION OF LOW VISION MODE — 11010

ADJUST CONTRAST FOR IMAGE BASED ON CONTRAST ADJUSTMENT SETTING INFORMATION — 11020

FIG. 12A

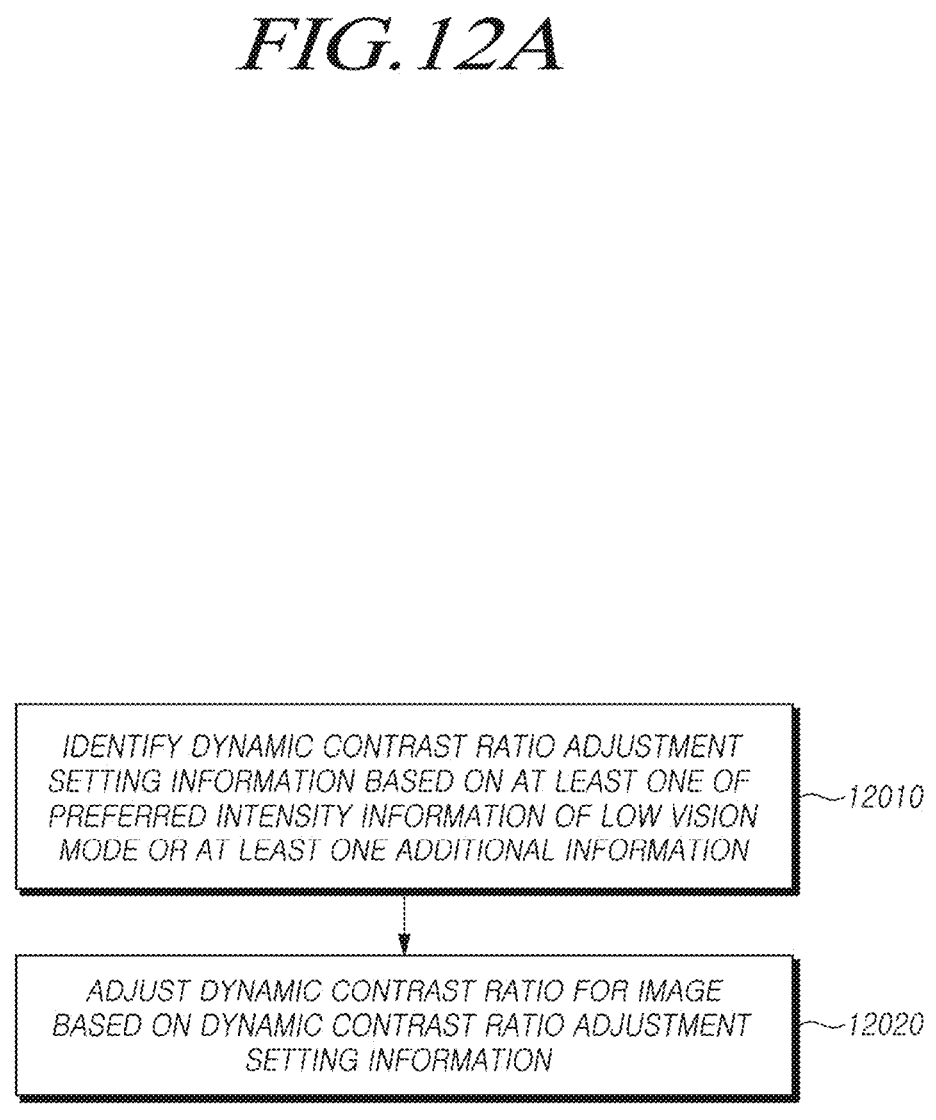

IDENTIFY DYNAMIC CONTRAST RATIO ADJUSTMENT SETTING INFORMATION BASED ON AT LEAST ONE OF PREFERRED INTENSITY INFORMATION OF LOW VISION MODE OR AT LEAST ONE ADDITIONAL INFORMATION ~12010

ADJUST DYNAMIC CONTRAST RATIO FOR IMAGE BASED ON DYNAMIC CONTRAST RATIO ADJUSTMENT SETTING INFORMATION ~12020

FIG. 13A

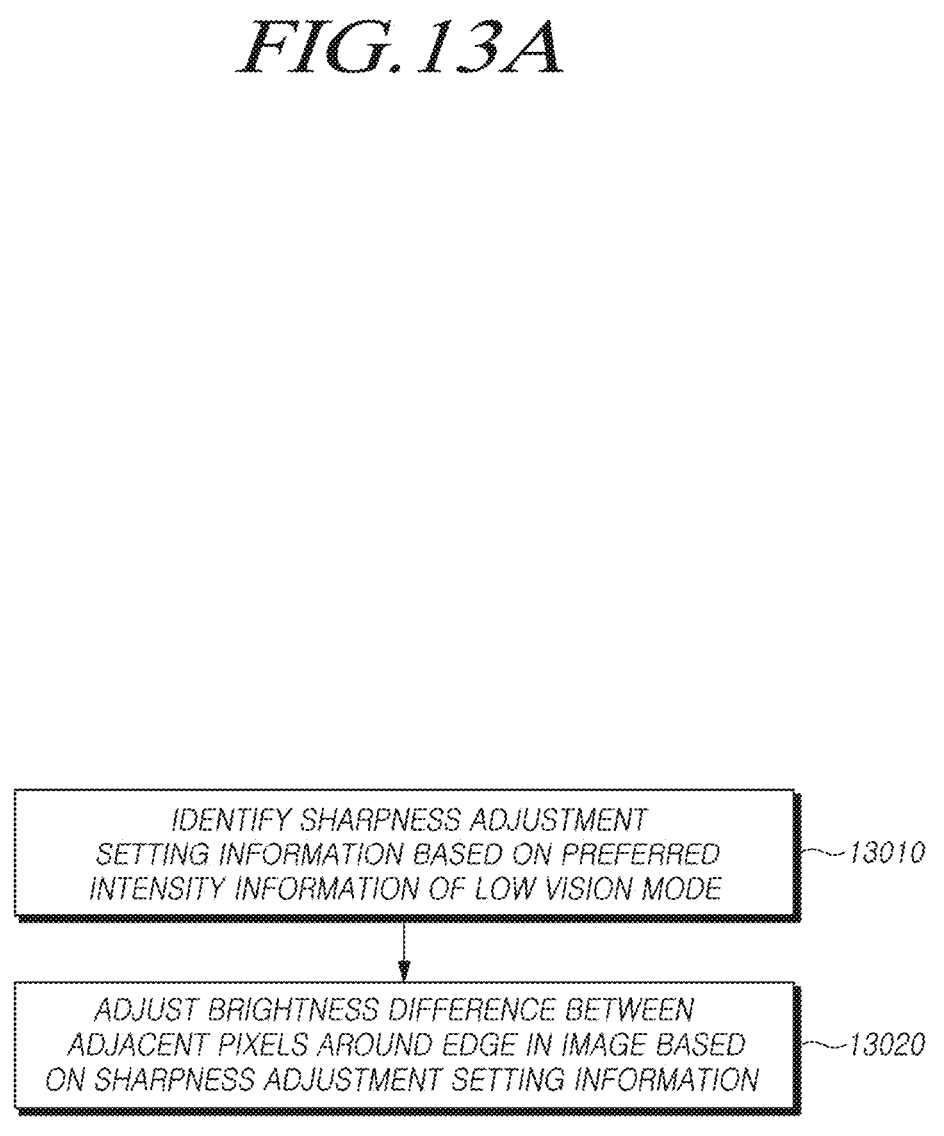

IDENTIFY SHARPNESS ADJUSTMENT SETTING INFORMATION BASED ON PREFERRED INTENSITY INFORMATION OF LOW VISION MODE ~13010

ADJUST BRIGHTNESS DIFFERENCE BETWEEN ADJACENT PIXELS AROUND EDGE IN IMAGE BASED ON SHARPNESS ADJUSTMENT SETTING INFORMATION ~13020

DISPLAY DEVICE FOR SUPPORTING IMAGE ADJUSTMENT AND CONTROL METHOD THEREOF

CROSS-REFERENCE TO RELATED APPLICATIONS

This application is a continuation application of International Application No. PCT/KR2024/095386 designating the United States, filed on Feb. 19, 2024, in the Korean Intellectual Property Receiving Office, and claiming priority to Korean Patent Application No. 10-2023-0067650, filed on May 25, 2023, in the Korean Intellectual Property Office, the disclosures of each of which are incorporated by reference herein in their entireties.

BACKGROUND

Field

The disclosure relates to a display device and a control method thereof and for example, to a display device for supporting image adjustment and a control method thereof.

Description of Related Art

Recently, various types of display devices supporting viewing assistance functions have been developed and distributed. The viewing assistance functions may include, e.g., a function that performs image processing for viewers with low vision as well as vision impairment.

The viewing assistance function for viewers with low vision supports image processing functions, such as providing an image magnification mode and an image color inversion mode but does not support flexible image processing functions considering factors, such as image characteristics and user characteristics/preferences.

Accordingly, a need exists for a flexible image processing method to increase visibility and accessibility to images for viewers with low vision.

SUMMARY

According to an embodiment of the disclosure, a display device may comprise: memory storing a program including at least one instruction and at least one processor, comprising processing circuitry, connected to the memory and configured to execute the at least one instruction of the program stored in the memory. At least one processor, individually and/or collectively, may be configured to: identify preferred intensity information indicating a first preferred intensity among a plurality of preferred intensities associated with image processing based on a low vision mode, based on an input, obtain edge thickness setting information corresponding to the first preferred intensity from the memory and perform edge thickness adjustment processing on an input image based on the obtained edge thickness setting information, obtain image quality adjustment setting information corresponding to the first preferred intensity from the memory and perform image quality adjustment processing on the image on which the edge thickness adjustment processing is performed based on the obtained image quality adjustment setting information. The memory may include edge thickness setting information corresponding to each of the plurality of preferred intensities and image quality adjustment setting information corresponding to each of the plurality of preferred intensities. Each image quality adjustment setting information may include setting information for adjusting at least one of a brightness, a dynamic contrast ratio, a sharpness, or a color for the image according to a corresponding preferred intensity.

According to an embodiment of the disclosure, a method for operating a display device may comprise at least one operation. The at least one operation may comprise identifying preferred intensity information indicating a first preferred intensity among a plurality of preferred intensities associated with image processing based on a low vision mode, based an input. The at least one operation may comprise obtaining edge thickness setting information corresponding to the first preferred intensity from memory. The at least one operation may comprise performing edge thickness adjustment processing on an input image based on the obtained edge thickness setting information. The at least one operation may comprise obtaining image quality adjustment setting information corresponding to the first preferred intensity from the memory. The at least one operation may comprise performing image quality adjustment processing on the image on which the edge thickness adjustment is performed based on the obtained image quality adjustment setting information. The memory may include edge thickness setting information corresponding to each of the plurality of preferred intensities and image quality adjustment setting information corresponding to each of the plurality of preferred intensities. Each image quality adjustment setting information may include setting information for adjusting at least one of a brightness, a dynamic contrast ratio, a sharpness, or a color for the image according to a corresponding preferred intensity.

BRIEF DESCRIPTION OF THE DRAWINGS

The above and other aspects, features, and advantages of certain embodiments of the present disclosure will be more apparent from the following description, taken in conjunction with the accompanying drawings, in which:

FIG. 6 is a diagram illustrating an example edge adjustment processing according to an embodiment of the disclosure;

FIG. 11A is a flowchart illustrating an example brightness adjustment operation according to an embodiment of the disclosure;

FIG. 12A is a flowchart illustrating an example dynamic contrast ratio adjustment operation according to an embodiment of the disclosure;

FIG. 13A is a flowchart illustrating an example sharpness adjustment operation according to an embodiment of the disclosure;

DETAILED DESCRIPTION

Figure 1:
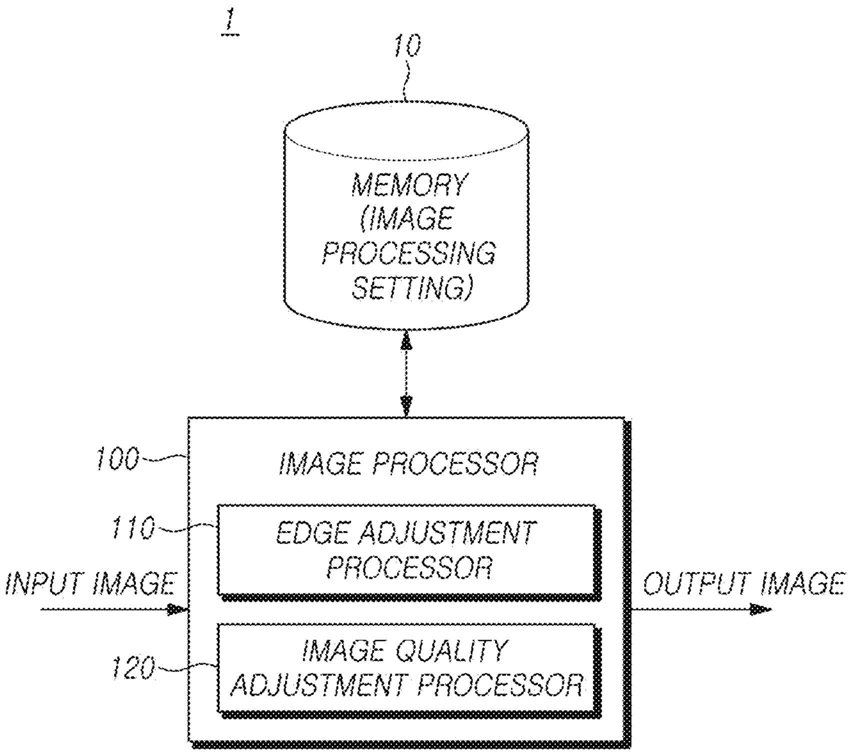
FIG. 1 is a block diagram illustrating an example configuration of an image processing device according to an embodiment of the disclosure.

Various example of the disclosure are now described in greater detail with reference to the accompanying drawings. However, the disclosure may be implemented in other various forms and is not limited to the example embodiments set forth herein. The same or similar reference numerals may be used to refer to the same or similar elements throughout the disclosure and the drawings. Further, for clarity and brevity, no description may be made of well-known functions and configurations.

It should be appreciated that the blocks in each flowchart and combinations of the flowcharts may be performed by computer program instructions.

Further, each block may represent a module, segment, or part of a code including one or more executable instructions for executing a specified logical function(s). Further, it should also be noted that in some embodiments, the functions mentioned in the blocks may occur in different orders. For example, two blocks that are consecutively shown may be performed substantially simultaneously or in a reverse order depending on corresponding functions.

As used herein, the term "unit" may refer, for example, to a software element and/or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more packet processing devices. Accordingly, as an example, a 'unit' includes elements, such as software elements, object-oriented software elements, class elements, and task elements, processes, functions, attributes, procedures, subroutines, segments of program codes, drivers, firmware, microcode, circuits, data, databases, data architectures, tables, arrays, and variables. Functions provided within the components and the 'units' may be combined into smaller numbers of components and 'units' or further separated into additional components and 'units'. Further, an element or a 'unit' may be implemented to reproduce one or more central processing units (CPUs) in a device or a security multimedia card. According to embodiments, a " . . . unit" may include one or more packet processing devices.

FIG. 1 is a block diagram illustrating an example configuration of an image processing device according to embodiment of the disclosure.

The image processing device 1 may support at least one image processing function for providing an image for a user having low vision (low vision user) and/or vision impairment. For example, the image processing device 1 may be a device supporting at least one image processing function for enhancing visibility and/or accessibility of an image of a user having low vision (low vision user). In the disclosure, the low vision user may be referred to as a low vision person or a low vision viewer.

Referring to FIG. 1, an image processing device 1 may include memory 10 and/or an image processor (e.g., including processing circuitry) 100.

According to an embodiment, the memory 10 may store information (image processing setting information) about a setting for image processing of the image processing device 1. The image processing setting information may include, e.g., setting information used for preprocessing, edge adjustment setting information including setting information used for image processing for edge adjustment, and/or image quality adjustment setting information including setting information used for image processing for image quality adjustment, but is not limited thereto.

In the disclosure, the edge may include, e.g., a portion in which the pixel value changes rapidly in the image and may include a boundary between a dark pixel and a bright pixel, a boundary between objects, and a boundary between an object and a background.

According to an embodiment, the image processor 100 may include various processing circuitry and/or multiple processors. For example, as used herein, including the claims, the term "processor", "image processor", or the like may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The image processor 100 may, for example, obtain an output image by performing image processing on the input image, based on the image processing setting information stored in the memory 10.

According to an embodiment, the image processor 100 may include an edge adjustment processor (e.g., including various processing circuitry and/or executable program instructions) 110 and an image quality adjustment processor (e.g., including various processing circuitry and/or executable program instructions) 120.

According to an embodiment, the edge adjustment processor 110 may obtain an output image by performing image processing for edge adjustment on the input image, based on the edge adjustment setting information stored in the memory 10. The operation of the edge adjustment processor 110 will be described in greater detail below with reference to FIGS. 3 and 5 to 7.

According to an embodiment, the image quality adjustment processor 120 may obtain an output image by performing image processing for image quality adjustment on an input image, based on the image quality adjustment setting information stored in the memory 10. The operation of the image quality adjustment processor 120 is described in greater detail below with reference to FIGS. 3 and 7 to 15.

For example, the operation of the edge adjustment processor 110 may be performed before the operation of the image quality adjustment processor 120. In this case, the image quality adjustment processor 120 may enhance the image quality based on the adjusted edge. For example, contrast or contrast sensitivity around the edge may be maximized and/or increased as compared to the original image. However, embodiments are not limited thereto. For example, the operation of the image quality adjustment processor 120 may be performed before the operation of the edge adjustment processor 110, or the operation of the image quality adjustment processor 120 may be performed (e.g., performed in parallel) together with the operation of the edge adjustment processor 110.

Figure 2:
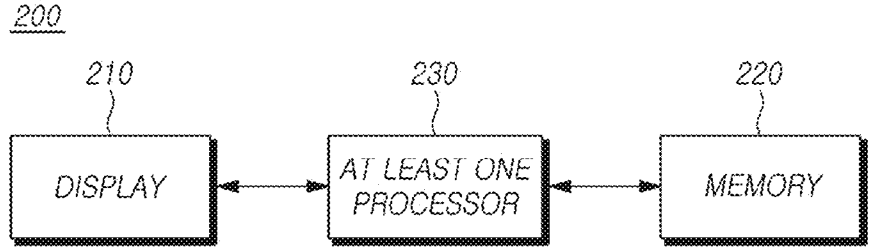
FIG. 2 is a block diagram illustrating an example configuration of a display device according to an embodiment of the disclosure.

FIG. 2 is a block diagram illustrating an example configuration of a display device according to an embodiment of the disclosure.

Referring to FIG. 2, a display device 200 may include a display 210, memory 220, and one or more processors (e.g., including processing circuitry) 230.

According to an embodiment, the display 210 may be implemented as various types of displays, for example and without limitation, a liquid crystal display (LCD), an organic light-emitting diode (OLED), a liquid crystal on silicon (LCoS), a digital light processing (DLP), quantum dot (QD) display panel, quantum dot light-emitting diodes (QLEDs), micro light-emitting diodes (μLEDs) or mini LEDs.

According to an embodiment, the display device 200 may be implemented as, e.g., a touch screen coupled to a touch sensor, a flexible display, a rollable display, a three-dimensional3D display, a display to which a plurality of display modules are physically connected, or the like.

According to an embodiment, the memory 220 may store data necessary for various embodiments of the disclosure. The memory 220 may be implemented in the form of memory embedded in the display device 200 or may be implemented in the form of memory detachable from the display device 200 according to the data storage purpose. For example, data for driving the display device 200 may be stored in memory embedded in the display device 200, and data for an extension function of the display device 200 may be stored in memory detachable from the display device 200. The memory embedded in the display device 200 may be implemented as at least one of, e.g., a volatile memory (e.g., a dynamic random access memory (DRAM), a static RAM (SRAM), or a synchronous dynamic RAM (SDRAM)) or a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). Further, the memory detachable from the display device 200 may be implemented as a memory card (e.g., compact flash (CF), secure digital (SD), micro secure digital (micro-SD), mini secure digital (mini-SD), extreme digital (xD), multi-media card (MMC)), an external memory (e.g., USB memory) connectable to a USB port, or the like.

According to an embodiment, the memory 220 may store a computer program including at least one instruction or instructions for controlling the display device 200.

According to an embodiment, various data may be stored in the external memory of the processor 230, some of the data may be stored in the internal memory of the processor 230, and the remaining data may be stored in the external memory.

According to an embodiment, the at least one processor 230 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The at least one processor 230 may, for example, control the overall operation of the display device 200.

According to an embodiment, the processor 230 may be implemented as a digital signal processor (DSP), a microprocessor, or a timing controller (TCON) that processes digital signals. However, without limitations thereto, the processor 230 may include one or more of a central processing unit (CPU), a micro controller unit (MCU), a micro processing unit (MPU), a controller, an application processor (AP), a communication processor (CP), an ARM processor, or an artificial intelligence (AI) processor or may be defined in a corresponding term. The processor 230 may be implemented as a system on chip (SoC) embedding a processing algorithm or large scale integration (LSI) or be implemented in the form of a field programmable gate array (FPGA). The processor 230 may perform various functions by executing computer executable instructions stored in the memory.

The processor 230 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The processor 230 may control one or any combination of other components of the electronic device and may perform an operation related to communication or data processing. The processor 230 may execute one or more programs or instructions stored in the memory. For example, the processor 230 may perform the method according to an embodiment of the disclosure by executing one or more instructions stored in the memory.

According to an embodiment, when a method includes a plurality of operations, the plurality of operations may be performed by one processor or a plurality of processors. For example, when a first operation, a second operation, and a third operation are performed by a method according to an embodiment, all of the first operation, the second operation, and the third operation may be performed by a first processor, the first operation and the second operation may be performed by the first processor (e.g., a general-purpose processor), and the third operation may be performed by a second processor (e.g., an AI dedicated processor).

The processor 230 may be implemented as a single core processor including a core or may be implemented as one or more multi-core processors including multiple cores (e.g., homogeneous multicore or heterogeneous multicore). When the processor 230 is implemented as a multi-core processor, each of the plurality of cores included in the multi-core processor may include a processor internal memory, such as a cache memory and an on-chip memory, and a common cache shared by the plurality of cores may be included in the multi-core processor. Further, each of the plurality of cores (or some of the plurality of cores) included in the multi-core processor may independently read and perform a program instruction for implementing a method according to an embodiment of the disclosures or may read and perform a program instruction for implementing a method according to an embodiment of the disclosure with all (or some) of the plurality of cores associated with each other.

When a method according to an embodiment includes a plurality of operations, the plurality of operations may be performed by one of the plurality of cores included in the multi-core processor or by the plurality of cores. For example, when the first operation, the second operation, and the third operation are performed by the method according to an embodiment, all of the first operation, the second operation, and the third operation may be performed by a first core included in the multi-core processor, the first operation and the second operation may be performed by the first core included in the multi-core processor, and the third operation may be performed by a second core included in the multi-core processor.

In various embodiments of the disclosure, the processor 230 may refer to a system-on-chip (SoC) in which one or more processors and other electronic components are integrated, a single core processor, a multi-core processor, or a core included in a single core processor or a multi-core processor, wherein the core may be implemented as a CPU, a GPU, an APU, an MIC, a DSP, an NPU, a hardware accelerator, a machine learning accelerator, or the like, but embodiments of the disclosure are not limited thereto.

According to an embodiment, the image processing device 1 of FIG. 1 may be included in the display device 100 of FIG. 2, may be the display device 100, or may include the display device 100. For example, when the image processing device 1 of FIG. 1 is included in the display device 100 of FIG. 2, the memory 10 of the image processing device 1 of FIG. 1 may be included in the memory 210 of the display device 100 of FIG. 2, and the image processor 100 of the image processing device 1 of FIG. 1 may be included in at least one processor 230 of the display device 100 of FIG. 2.

Figure 3:
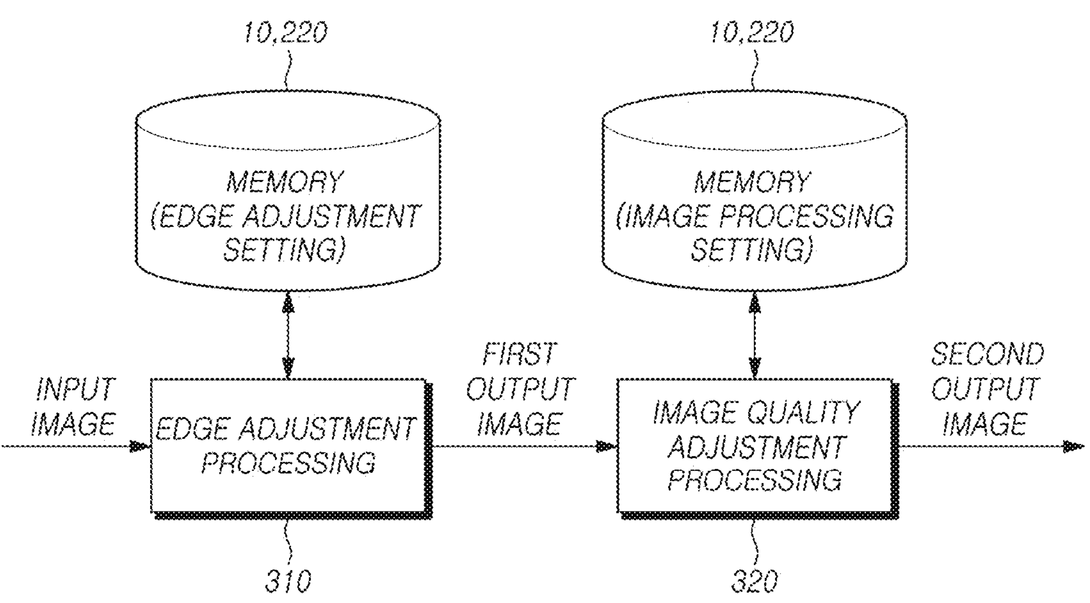
FIG. 3 is a diagram illustrating an example image processing method according to an embodiment of the disclosure.

FIG. 3 is a diagram illustrating an example image processing method according to an embodiment of the disclosure.

An electronic device (e.g., the image processing device 1 of FIG. 1 or the display device 200 of FIG. 2) may support a normal mode for providing image processing for a general user or a low vision mode for providing image processing for user(s) with low vision and/or vision impairment. The low vision mode may be, e.g., a mode for providing at least one image processing function for enhancing visibility and/or accessibility to an image of a low vision user. In the disclosure, the low vision mode may be referred to as a low vision viewing mode.

According to an embodiment, when the low vision mode is applied, the electronic device may perform at least one of an image processing operation 310 (hereinafter, an edge adjustment processing operation) for adjusting an edge of an image or an image processing operation 320 (hereinafter, an image quality adjustment processing operation) for adjusting image quality.

The edge adjustment processing operation 310 may be performed by, e.g., the edge adjustment processor 110 of FIG. 1, the image processor 100 of FIG. 1, and/or the at least one processor 230 of FIG. 2. The image quality adjustment processing operation 320 may be performed by, e.g., the image quality adjustment processor 120 of FIG. 1, the image processor 100 of FIG. 1, and/or the at least one processor 230 of FIG. 2.

Referring to FIG. 3, in the edge adjustment processing operation 310, the electronic device may obtain an output image (a first output image) by performing image processing for edge adjustment on the input image. For example, the electronic device may obtain the first output image by performing image processing for edge adjustment on the input image, based on the edge adjustment setting information stored in the memory 10 or 220.

Image processing for edge adjustment may include, for example, and without limitation, at least one of the following image processing operations:

- At least one operation for preprocessing an image (e.g., an input image);
- At least one operation for detecting an edge of an image or a preprocessed input image;
- At least one operation for adjusting the detected edge (the adjustment of the detected edge may include, e.g., at least one of adjustment of the thickness of the detected edge or adjustment of the color of the detected edge; and/or
- At least one operation for obtaining an output image by combining an image including an adjusted edge (or an edge image) and an input image (or a preprocessed input image)(the combination of images may be based on, e.g., at least one of an overlay function or a blending function.

The edge adjustment setting information may include, e.g., setting information for at least one parameter required to adjust the edge for the image. For example, the edge adjustment setting information may include setting information about a parameter (an edge thickness adjustment parameter) for adjusting the thickness of the edge and/or setting information about a parameter (an edge color adjustment parameter) for adjusting the color of the edge.

The setting information about the edge thickness parameter may include, e.g., information on a thickness value corresponding to each preferred intensity of the low vision mode. The preferred intensity may correspond to the preferred intensity of image adjustment (e.g., edge adjustment and/or image quality adjustment) during image processing according to the low vision mode. The low vision mode may use a preset number (e.g., three) of preferred intensities.

The setting information about the edge color parameter may include, e.g., information about a color value corresponding to each preferred color of the low vision mode. The preferred color may correspond to the preferred color of the edge when image processing according to the low vision mode is performed. The low vision mode may use a preset number (e.g., two) of preferred colors.

In the image quality adjustment processing operation 320, the electronic device may obtain an output image by performing image processing for image quality adjustment on the input image. For example, the electronic device may obtain the output image (e.g., the second output image) by performing image processing for image quality adjustment on the input image (e.g., the first output image), based on the image quality adjustment setting information stored in the memories 10 and 220. The output image may have an effect of enhancing visibility and image quality. The output image may be provided through a display (e.g., the display 210 of FIG. 2).

Image processing for image quality adjustment may include, for example and without limitation, at least one of the following image processing operations:

- At least one operation for adjusting contrast or dynamic range for an image (e.g., the first output image);
- At least one operation for adjusting the dynamic contrast ratio for the image;
- At least one operation for adjusting sharpness or detail enhancement of an image;
- At least one operation for adjusting the color of the image;
- At least one operation for AI upscaling on an image;
- At least one operation for frame rate conversion (FRC) for an image;
- At least one operation for adjusting the brightness of the image; and/or
- At least one operation for adjusting the color specification (e.g., standard dynamic range (SDR) or high dynamic range (HDR)) for the image.

The image quality adjustment setting information may include, e.g., setting information about at least one parameter required to adjust image quality for an image. For example, the image quality adjustment setting information may include, but is not limited to, setting information about a parameter (a contrast adjustment parameter) for adjusting contrast, setting information about a parameter (a dynamic contrast ratio adjustment parameter) for adjusting dynamic contrast ratio, setting information about a parameter (a sharpness adjustment parameter) for adjusting sharpness, setting information about a parameter (a color adjustment parameter) for adjusting color, setting information about a parameter for AI upscaling, and/or setting information about a parameter for frame rate conversion.

Figure 4A:
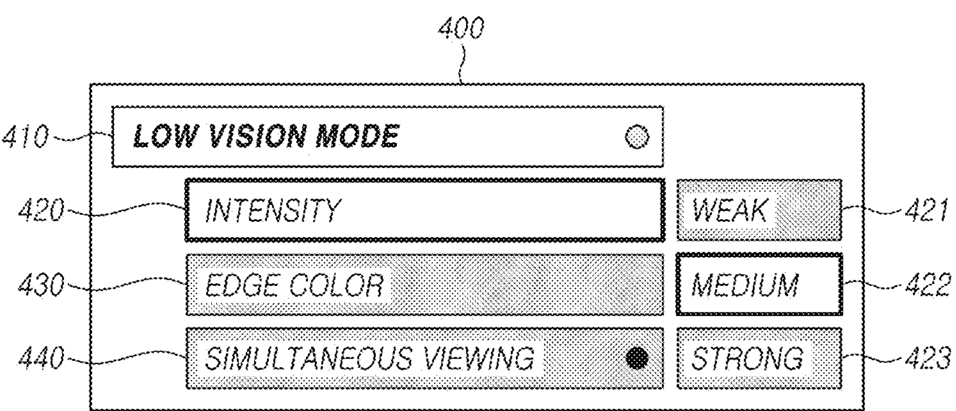
FIG. 4A is a diagram illustrating adjustment of a preferred intensity for a low vision mode according to an embodiment of the disclosure.
Figure 4B:
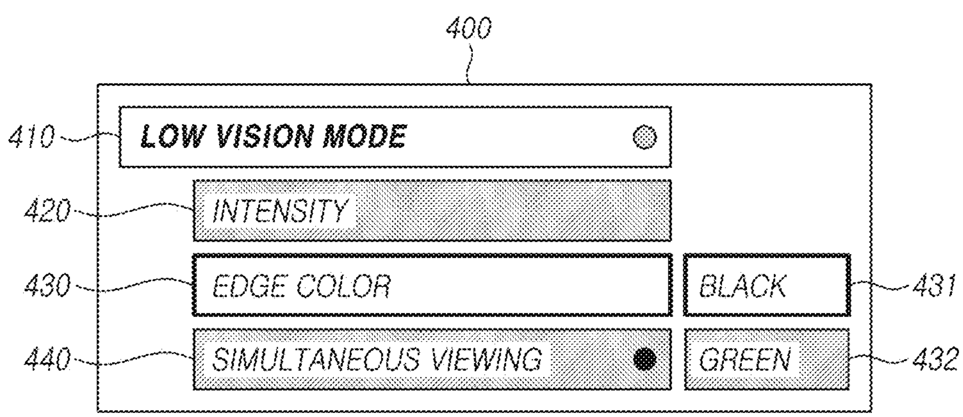
FIG. 4B is a diagram illustrating adjustment of a preferred color for a low vision mode according to an embodiment of the disclosure.
Figure 4C:
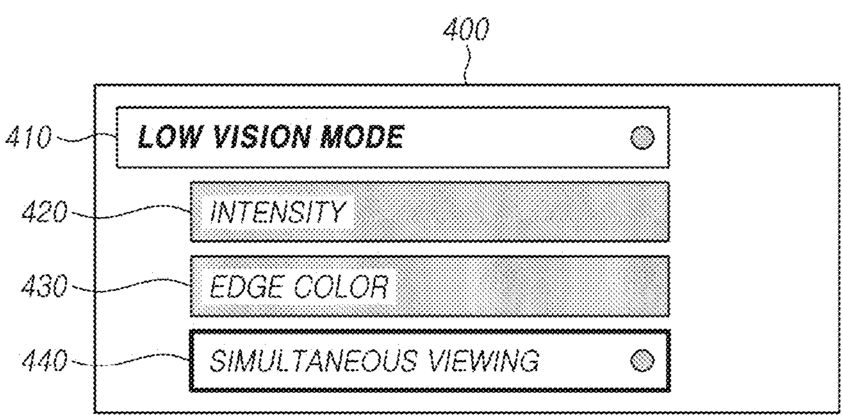
FIG. 4C is a diagram illustrating use of a simultaneous viewing mode according to an embodiment of the disclosure.

FIG. 4A is a diagram illustrating adjustment of a preferred intensity for a low vision mode according to an embodiment of the disclosure. FIG. 4B is a diagram illustrating adjustment of a preferred color for a low vision mode according to an embodiment of the disclosure. FIG. 4C is a diagram illustrating use of a simultaneous viewing mode according to an embodiment of the disclosure.

Referring to FIGS. 4A, 4B, and 4C, an electronic device (e.g., the image processing device 1 of FIG. 1 or the display device 200 of FIG. 2) may display a screen 400 for adjusting a setting of a low vision mode on a display.

The screen 400 may include an item 410 corresponding to the low vision mode. The user may apply the low vision mode to the image by selecting the item 410. The electronic device may identify the user's selection for the item 410 based on an input, e.g., a user input.

The screen 400 may include at least one of an item 420 corresponding to the preferred intensity of the low vision mode, an item 430 corresponding to the preferred color of the low vision mode, or an item 440 corresponding to the simultaneous viewing mode. For example, when the item 410 corresponding to the low vision mode is selected, the electronic device may display, on the screen 400, at least one of the item 420 corresponding to the preferred intensity of the low vision mode, the item 430 corresponding to the preferred color of the low vision mode, and/or the item 440 corresponding to the simultaneous viewing mode.

The preferred intensity of the low vision mode may correspond to the preferred intensity of image adjustment (e.g., edge adjustment and/or image quality adjustment) when image processing according to the low vision mode is performed. The electronic device may determine the intensity of image processing for edge adjustment and/or image quality adjustment according to the preferred intensity selected by the user. The low vision mode may use a preset number (e.g., three, but not limited thereto) of preferred intensities.

The screen 400 may include at least one selection option associated with the item 420. For example, when the item 420 is selected, the electronic device may display at least one selection option associated with the item 420 on the screen 400. For example, when the number of preferred intensities is set to three, as illustrated in FIG. 4A, the electronic device may display at least one of a selection option 421 indicating that the preferred intensity of the low vision mode corresponds to weak, a selection option 422 indicating that the preferred intensity of the low vision mode corresponds to medium, or a selection option 422 indicating that the preferred intensity of the low vision mode corresponds to strong, but is not limited thereto. The user may select a preferred intensity of the low vision mode by selecting one of selection options respectively corresponding to the preferred intensities of the low vision mode displayed on the screen 400. The electronic device may identify the preferred intensity of the low vision mode to be used, based on a user input.

The preferred color of the low vision mode may correspond to the preferred color of the edge when image processing according to the low vision mode is performed. For example, the electronic device may determine the color of the edge according to the preferred color selected by the user. The low vision mode may use a preset number (e.g., two, but not limited thereto) of preferred colors.

The screen 400 may include at least one selection option associated with the item 430. For example, when the item 430 is selected, the electronic device may display at least one selection option associated with the item 430 on the screen 400. For example, when the number of preferred colors is set to two, as illustrated in FIG. 4B, the electronic device may display at least one of a selection option 431 indicating that the preferred color of the low vision mode corresponds to black or a selection option 432 indicating that the preferred color of the low vision mode corresponds to green, but is not limited thereto. The user may select a preferred color of the low vision mode to be used by selecting one of selection options respectively corresponding to the preferred colors of the low vision mode displayed on the screen 400. The electronic device may identify a preferred color of the low vision mode to be used, based on a user input, and may identify a color of an edge of the input image, based on the preferred color.

The simultaneous viewing mode may be a mode in which an image processed according to the low vision mode and an image processed according to the normal mode are simultaneously displayed on the screen 400. For example, as illustrated in FIG. 4C, when the item 440 is selected, the electronic device may apply the simultaneous viewing mode.

Because the low vision user has a lower visual recognition ability than the general user, it may be more difficult for the low vision user to identify and/or recognize the selection items/options when the number of selection items/options associated with the low vision mode is subdivided and provided on the screen in a detailed manner. Therefore, rather than subdividing and providing the number of selection items/options associated with the low vision mode in a detailed manner, providing them in a simplified manner may be advantageous to the low vision user. For example, as illustrated in FIG. 4A, it may be advantageous and more effective to the low vision user to simplify and provide the selection options of the preferred intensity of the low vision mode to three levels or less, such as weak/medium/strong. For example, as illustrated in FIG. 4B, it may be advantageous and helpful to the low vision user to simplify the selection options of the preferred color of the low vision mode into two options such as black/green. For example, as illustrated in FIGS. 4A to 4C, it may be advantageous to the low vision user to simplify the number of selection items associated with the low vision mode to three (e.g., the item 420, the item 430, and the item 440) or less and provide them on one screen.

Figure 5:
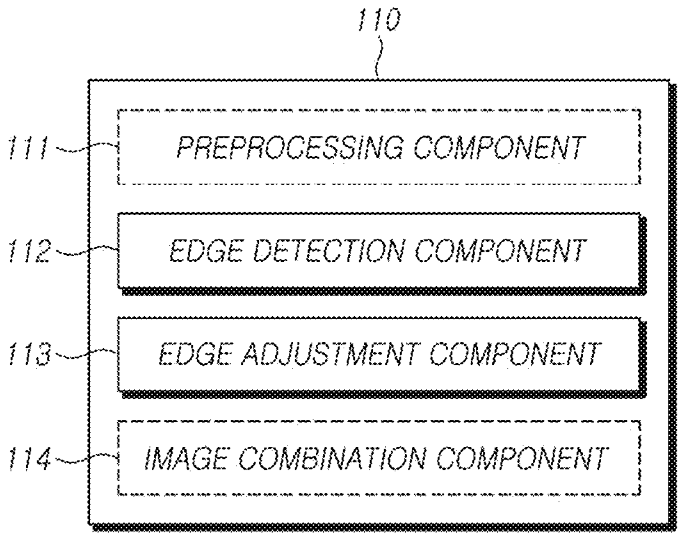
FIG. 5 is a block diagram illustrating an example configuration of an edge adjustment processor according to an embodiment of the disclosure.

FIG. 5 is a block diagram illustrating an example configuration of an edge adjustment processor according to an embodiment of the disclosure.

Referring to FIG. 5, the edge adjustment processor (e.g., including processing circuitry) 110 may include, e.g., a preprocessing component 111, an edge detection component 112, an edge adjustment component 113, and/or an image combination component 114. The preprocessing component 110 and/or the image combination component 114 may be omitted or may be included as a component other than the edge adjustment processor 110, as an optional component of the edge adjustment processor 110. Each of the components may include various circuitry and/or executable program instructions.

The preprocessing component 111 may perform preprocessing on the input image.

When a preset condition is met, the preprocessing component 111 may perform preprocessing on the input image. The preset condition may include, e.g., a case where noise (e.g., detail texture) is detected in the input image.

The preprocessing component 111 may perform preprocessing on the input image using a predetermined preprocessing method. The predetermined preprocessing method may include, but is not limited to, a blurring method, a capturing method, and/or a de-noising method.

The blurring method according to an embodiment may be a method using sub-sampling and interpolation. For example, the preprocessing component 111 may have a blurring effect by reducing the size of the input image using sub-sampling and then increasing the size of the image back to the size of the original input image using interpolation. Accordingly, noise included in the input image may be removed.

The blurring method according to an embodiment may be a method using filtering. For example, when filtering an input image using a convolution kernel/filter, the preprocessing component 111 may have a blurring effect by adjusting a filter coefficient. For example, the preprocessing component 111 may perform texture filtering on the input image. Texture filtering may include, but is not limited to, Gaussian smoothing, edge-preserving & smoothing, or edge-preserving filtering.

The capturing method according to an embodiment may use a method of capturing a down-sampled input image. For example, the preprocessing component 111 may reduce the size of the image by down-sampling the input image, perform capturing on the down-sampled image, and up-sample the captured image to increase the size of the image to the original size of the input image, thereby removing noise.

The de-noising method, according to an embodiment, may be a method using a de-noising filter. For example, the preprocessing component 111 may perform processing to remove noise included in the input image by applying a de-noising filter to the input image.

The edge detection component 112 may detect (or identify) an edge included in an image (e.g., an input image or a preprocessed image). For example, the edge detection component 112 may detect an edge of at least one object included in the image. For example, the edge detection component 112 may detect an edge corresponding to an object (e.g., a text object, a human object, an object greater than or equal to a threshold size, or an object positioned in one area of the screen (e.g., an object positioned in a central area of the screen)) meaningful (e.g., useful, effective) to the low vision user among a plurality of objects included in the image. For example, the electronic device may detect the edge by performing image binarization (or image thresholding) on the image. Image binarization may be, e.g., image segmentation or image classification. Through image binarization, e.g., the pixel corresponding to the edge may be set to a first value (e.g., 1), and the pixel not corresponding to the edge may be set to a second value (e.g., 0).

The output image of the edge detection component 112 may be referred to as an edge image.

The edge adjustment component 113 may adjust at least one edge included in the image (e.g., the edge image). For example, the edge adjustment component 113 may adjust at least one of the thickness or the color for at least one edge included in the image.

According to an embodiment, the edge adjustment component 113 may adjust the thickness of at least one edge included in the image based on the preferred intensity information of the low vision mode. The preference intensity information may indicate one of at least one preference intensity.

For example, when the preferred intensity of the low vision mode is the first intensity (e.g., strong), the edge adjustment component 113 may adjust the thickness of at least one edge included in the edge image to a first thickness corresponding to the first intensity. As the preferred intensity of the low vision mode increases, the thickness of the edge corresponding to the preferred intensity may increase. For example, the thickness of the edge corresponding to the preferred intensity of the low vision mode corresponding to strong may be thicker than the thickness of the edge corresponding to the preferred intensity of the low vision mode corresponding to medium (or weak).

According to an embodiment, the edge adjustment component 113 may perform image processing of adjusting the edge corresponding to at least one object meeting a preset condition among the plurality of objects to be relatively thicker than the edge corresponding to the remaining objects. For example, the edge adjustment component 113 may adjust the thickness of the edge corresponding to the at least one object meeting the preset condition to the thickness of the edge corresponding to the preferred intensity of the low vision mode, and adjust the thickness of the edge corresponding to the remaining objects to the thickness of the edge relatively thinner than the thickness of the edge corresponding to the preferred intensity of the low vision mode. The preset condition may include, e.g., a condition for identifying a meaningful object (e.g., a text object, a human object, an object of a threshold size or more, and an object (e.g., an object positioned in a central area of the screen) positioned in one area of the screen) in the input image but is not limited thereto.

The edge adjustment component 113 according to an embodiment may adjust the color of at least one edge included in the edge image based on the preferred color of the low vision mode. The preferred color information may indicate one (e.g., black) of at least one preferred color.

The output image of the edge adjustment component 113 may be referred to as an edge adjustment image.

The image combination component 114 may combine the input image (or the preprocessed image) and the edge adjustment image.

According to an embodiment, the image combination component 114 may obtain an output image (the first output image) by combining the edge adjustment image and the input image (or the preprocessed image).

The image combination component 114 according to an embodiment may combine the edge adjustment image and the input image (or the preprocessed image) using an overlay method or a blending method. For example, the image combination component 114 may obtain an output image by overlaying the edge adjustment image on the input image (or the preprocessed image). For example, the image combination component 114 may obtain the output image by blending the edge adjustment image with the input image (or the preprocessed image).

The output image thus obtained corresponds to a combined image of the input image (or the preprocessed image) and the image in which at least one of the thickness or color of the edge has been adjusted and thus corresponds to an image with enhanced visibility.

FIG. 6 is a diagram illustrating example edge adjustment processing according to an embodiment of the disclosure.

An electronic device (e.g., the image processing device 1 of FIG. 1 or the display device 200 of FIG. 2) may perform an image processing operation (e.g., the edge adjustment processing operation 310 of FIG. 3) for edge adjustment.

Referring to FIG. 6, the image processing operation for edge adjustment may include a preprocessing operation 311, an edge detection operation 312, an edge adjustment operation 313, and/or an image combination operation 314. The edge adjustment operation 313 may include an edge thickness adjustment operation 313*a* and/or an edge color adjustment operation 313*b*.

In the example of FIG. 6, an assumption is made that the preprocessing condition is met, and the preprocessing is performed.

In the preprocessing operation 311, the electronic device may perform preprocessing on the input image and output the preprocessed image. The image quality of the preprocessed image may be reduced, but noise may be removed. The preprocessing operation 311 may be performed by, e.g., the preprocessing component 111 of FIG. 5. The description of FIG. 5 may apply to the description of the preprocessing operation by the preprocessing component 111.

In the edge detection operation 311, the electronic device may perform edge detection on the preprocessed image to output an edge image including the detected edge. The edge detection operation 311 may be performed by, e.g., the edge detection component 112 of FIG. 1. The description of FIG. 5 may apply to the description of the edge detection operation by the edge detection component 112.

In the edge adjustment operation 313, the electronic device may adjust at least one edge included in the edge image and may output the edge adjustment image including the adjusted edge. The edge adjustment operation 313 may be performed by, e.g., the edge adjustment component 112 of FIG. 1. The description of FIG. 5 may apply to the description of the edge adjustment operation by the edge adjustment component 112.

According to an embodiment, the electronic device may adjust the thickness of at least one edge included in the edge image based on the preferred intensity of the low vision mode. The preferred intensity of the low vision mode may be identified based on a user input (e.g., a user input selecting the item 420 of FIG. 4A and the selection options 421, 422, and 423).

The electronic device according to an embodiment may adjust the color of at least one edge included in the edge image based on the preferred color of the low vision mode. The preferred color of the low vision mode may be identified based on a user input (e.g., a user input selecting the item 430 and the selection options 431 and 432 of FIG. 4B).

In image combination operation 314, the electronic device may obtain the first output image by combining the edge adjustment image and the preprocessed image. The image combination operation 314 may be performed by, e.g., the image combination component 114 of FIG. 1. The description of FIG. 5 may apply to the description of the image combination operation by the image combination component 114.

Since the first output image obtained according to the edge adjustment process corresponds to an image in which the thickness and/or color of the edge is adjusted, the first output image may have enhanced visibility as compared to the input image. By adjusting the edge only, the degree of visibility enhancement may be low or the quality of the image may be low. Therefore, it is necessary to further perform image processing for image quality adjustment in order to provide higher visibility and accessibility for the low vision user. This is described in greater detail below.

Figure 7:
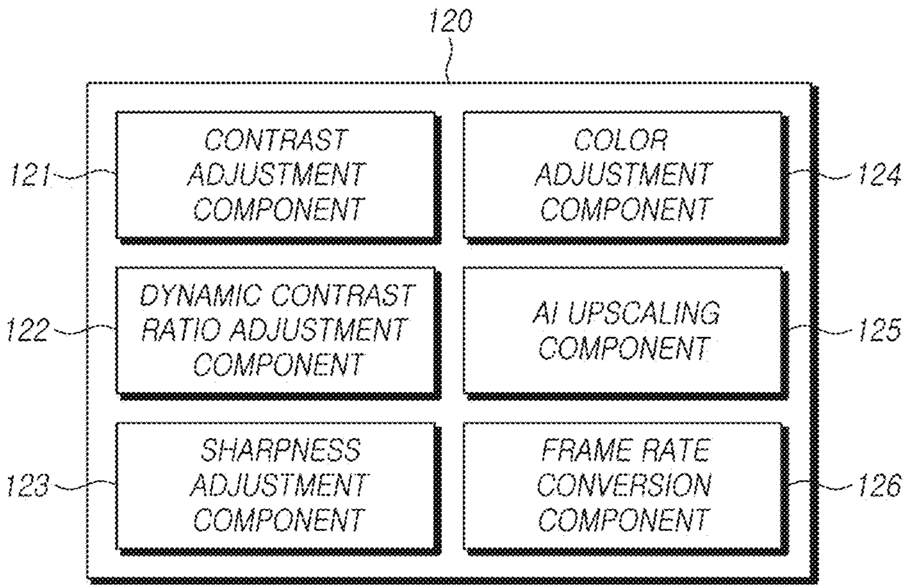
FIG. 7 is a block diagram illustrating an example configuration of an image quality adjustment processing unit according to an embodiment of the disclosure.

FIG. 7 is a block diagram illustrating an example configuration of an image quality adjustment processing unit according to an embodiment of the disclosure.

Referring to FIG. 7, the image quality adjustment processor (e.g., including processing circuitry) 120 may include, e.g., a contrast adjustment component 121, a dynamic contrast ratio adjustment component 122, a sharpness adjustment component 123, a color adjustment component 124, an AI upscaling component 125, and a frame rate conversion component 126. Each of the various components may include various circuitry and/or executable program instructions.

The contrast adjustment component 121 may adjust contrast for an image (e.g., the first output image). According to an embodiment, the contrast adjustment component 121 may adjust the contrast of the image based on the preferred intensity information of the low vision mode. For example, the contrast adjustment component 121 may identify the contrast adjustment setting information based on the preferred intensity information of the low vision mode and adjust the contrast of the image based on the contrast adjustment setting information. The contrast adjustment component 121 may output an image of which contrast is adjusted. The operation of the contrast adjustment component 121 is described in greater detail below with reference to FIGS. 11A and 11B.

The dynamic contrast ratio adjustment component 122 may adjust a dynamic contrast ratio for an image (e.g., a first output image). The dynamic contrast ratio adjustment component 122 according to an embodiment may adjust the dynamic contrast ratio for the image, based on the preferred intensity information of the low vision mode. For example, the dynamic contrast ratio adjustment component 122 may identify the dynamic contrast ratio adjustment setting information based on the preferred intensity information of the low vision mode and adjust the dynamic contrast ratio for the image based on the dynamic contrast ratio adjustment setting information. The dynamic contrast ratio adjustment component 122 may output an image in which the dynamic contrast ratio is adjusted. The operation of the dynamic contrast ratio adjustment component 122 is described in greater detail below with reference to FIGS. 12A and 12B.

The sharpness adjustment component 123 may adjust sharpness of an image (e.g., a first output image). According to an embodiment, the sharpness adjustment component 123 may adjust sharpness around an edge of an image, based on the preferred intensity information of the low vision mode. For example, the sharpness adjustment component 123 may adjust the sharpness by identifying the sharpness adjustment setting information based on the preferred intensity information of the low vision mode and adjusting the brightness difference between adjacent pixels around the edge in the image based on the sharpness adjustment setting information. The sharpness adjustment component 123 may output an image of which sharpness is adjusted. The operation of the sharpness adjustment component 123 is described in greater detail below with reference to FIGS. 13A, 13B and 13C.

The color adjustment component 124 may adjust the color of an image (e.g., a first output image). According to an embodiment, the color adjustment component 124 may adjust the color of the image based on the preferred intensity information of the low vision mode. For example, the color adjustment component 124 may identify the color adjustment setting information based on at least one of the preferred intensity information of the low vision mode or a preset lookup table and perform color adjustment on at least a portion of the image based on the color adjustment setting information. The color adjustment component 124 may output a color-adjusted image. The operation of the color adjustment component 124 is described in greater detail below with reference to FIGS. 14 and 15.

The AI upscaling component 125 may remove artifacts (e.g., jagging artifacts) included in an image (e.g., a first output image) using the trained AI model. The AI upscaling component 125 may smoothly adjust an edge included in an image (e.g., a first output image) using the trained AI model.

The AI model may include, for example, and without limitation, a convolutional neural network (CNN), a recurrent neural network (RNN), a generative adversarial network (GAN), reinforcement learning (RL), or a transformer, but is not limited thereto. The AI model may be generated as a personalized model by being trained based on characteristic information about the image and user information (e.g., vision, preferred intensity, and preferred color) about the low vision user.

When the edge of the image is adjusted according to the preferred intensity, a jagging artifact may be strongly visible in the adjusted image according to the direction of the edge. In this case, the AI upscaling component 125 may be used to remove the jagging artifact.

The AI upscaling component 125 according to an embodiment may remove artifacts included in an image in which at least one of the thickness or the color of the edge is adjusted according to the preferred intensity, using a trained first AI model. The trained first AI model may be trained to reduce artifacts included in the image in which the thickness of the edge is adjusted according to each preferred intensity.

The AI upscaling component 125 according to an embodiment may perform upscaling to generate a high-resolution image from the image in which at least one of the thickness or the color of the edge is adjusted according to the preferred intensity, using the trained second AI model. The trained second AI model may be trained to generate a high-resolution image by performing upscaling on the image in which the thickness of the edge is adjusted according to each preferred intensity.

The AI upscaling component 125 according to an embodiment may perform upscaling to remove artifacts included in the image in which at least one of the thickness or the color of the edge is adjusted according to the preferred intensity and to generate a high-resolution image, using a trained third AI model. The trained third AI model may be trained to generate a high-resolution image by reducing artifacts included in the image in which the thickness of the edge is adjusted according to each preferred intensity and upscaling the image.

The frame rate conversion component 126 may adjust a frame rate for an image (e.g., a first output image). For example, even if the input image is set to have a low frame rate or although the input image is set to have a high frame rate, the input image is required to be processed at a low frame rate to reduce the system load, e.g., during processing, the frame rate may need to be converted to a high frame rate according to the display output. For example, for output at least 60 Hz or more, it is necessary to perform a frame rate conversion operation for an input source of 24 Hz.

For example, when the low vision mode is applied to a variable refresh rate (VRR) source having a variable frame rate of an input frame, such as a game source, the display device may perform frame sampling (or frame selection) for processing at a fixed frame rate. In this case, the frame rate conversion component 126 may perform frame rate conversion to provide an image processed according to the low vision mode as an output suitable for the input.

Figure 8:
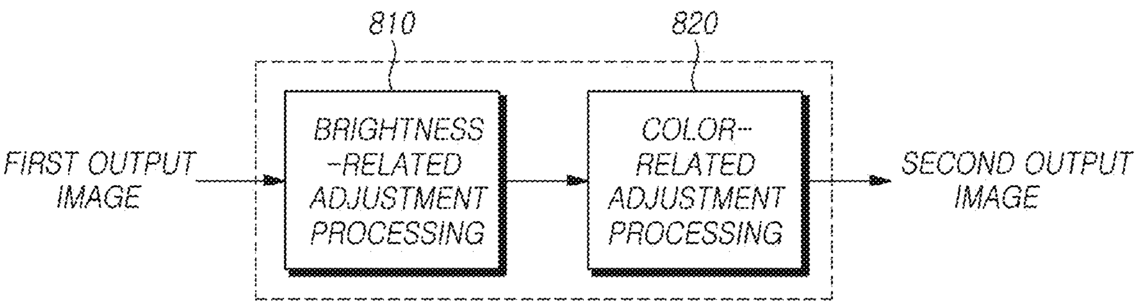
FIG. 8 is a diagram illustrating an example image quality adjustment processing according to an embodiment of the disclosure.
Figure 9:
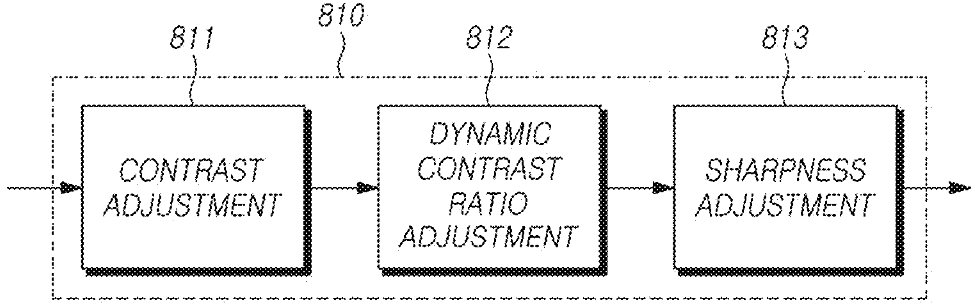
FIG. 9 is a diagram illustrating an example brightness-related adjustment processing according to an embodiment of the disclosure.

FIG. 8 is a diagram illustrating example image quality adjustment processing according to an embodiment of the disclosure. FIG. 9 is a diagram illustrating example brightness-related adjustment processing of an electronic device according to an embodiment of the disclosure.

An electronic device (e.g., the image processing device 1 of FIG. 1 or the display device 200 of FIG. 2) may perform an image processing operation (e.g., the image quality adjustment processing operation 320 of FIG. 3) for image quality adjustment.

Referring to FIG. 8, the image processing operation for image quality adjustment may include a brightness-related adjustment processing operation 810 and/or a color-related adjustment processing operation 820.

In the brightness-related adjustment processing operation 810, the electronic device may perform at least one operation for brightness-related adjustment for the first output image. Brightness-related adjustments may include, but are not limited to, contrast adjustment, dynamic contrast ratio adjustment, and/or sharpness adjustment.

According to an embodiment, the electronic device may perform at least one operation (a contrast adjustment operation) for contrast adjustment on the first output image. The contrast adjustment operation may be performed by, e.g., the contrast adjustment component 121 of FIG. 7. The description of FIG. 7 may apply to the description of the contrast adjustment operation by the contrast adjustment component 121.

According to an embodiment, the electronic device may perform at least one operation (a dynamic contrast ratio adjustment operation) for dynamic contrast ratio adjustment on the first output image. The dynamic contrast ratio adjustment operation may be performed by, e.g., the dynamic contrast ratio adjustment component 122 of FIG. 7. The description of FIG. 7 may apply to the description of the dynamic contrast ratio adjustment operation by the dynamic contrast ratio adjustment component 122.

According to an embodiment, the electronic device may perform at least one operation (a sharpness adjustment operation) for sharpness adjustment on the first output image. The sharpness adjustment operation may be performed by, e.g., the sharpness adjustment component 123 of FIG. 7. The description of FIG. 7 may apply to the description of the sharpness adjustment operation by the sharpness adjustment component 123.

As illustrated in FIG. 9, the contrast adjustment operation 811 according to an embodiment may be performed before the dynamic contrast ratio adjustment operation 812 or the sharpness adjustment operation 813. In this case, the contrast-adjusted image may be used for dynamic contrast ratio adjustment or sharpness adjustment.

The dynamic contrast ratio adjustment operation 812 according to an embodiment may be performed before the sharpness adjustment operation 813, as illustrated in FIG. 9. In this case, the dynamic contrast ratio-adjusted image may be used for sharpness adjustment.

The brightness-adjusted first output image may be output through the processing of the brightness-related adjustment processing operation 810 described above.

In the color-related adjustment processing operation 820, the electronic device may perform at least one operation for color-related adjustment for the brightness-adjusted first output image. The color-related adjustment may include, e.g., color adjustment.

According to an embodiment, the electronic device may perform at least one operation for color adjustment on the brightness-adjusted first output image. At least one operation for color adjustment may be performed, e.g., by the color adjustment component 124 of FIG. 7. The description of FIG. 7 may apply to the description of the color adjustment operation by the color adjustment component 124.

As illustrated in FIG. 8, when the brightness-related adjustment processing operation 810 is performed before the color-related adjustment processing operation 820, various brightness-related adjustment processing may be completed without a color conversion process for the color space, and then color adjustment processing may be performed by performing one color conversion, thereby increasing the efficiency of image processing for the low vision user.

The AI upscaling operation may be performed before, after, or together with the brightness-related adjustment processing operation 810. The AI upscaling operation may be performed before, after, or together with the color-related adjustment processing operation 820.

Figure 10:
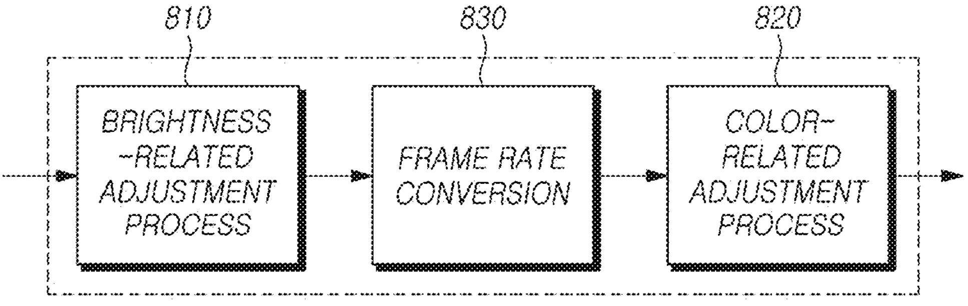
FIG. 10 is a diagram illustrating an example image quality adjustment processing according to an embodiment of the disclosure.

FIG. 10 is a diagram illustrating example image quality adjustment processing according to an embodiment of the disclosure.

An electronic device (e.g., the image processing device 1 of FIG. 1 or the display device 200 of FIG. 2) may perform an image processing operation (e.g., the image quality adjustment processing operation 320 of FIG. 3) for image quality adjustment.

Referring to FIG. 10, the image processing operation for image quality adjustment may include a brightness-related adjustment processing operation 810, a color-related adjustment processing operation 820, and/or a frame rate conversion operation 830. The description of FIGS. 8 and 9 may apply to the brightness-related adjustment processing operation 810 and the color-related adjustment processing operation 820.

In the example of FIG. 10, the frame rate conversion operation 830 may be performed between the brightness-related adjustment processing operation 810 and the color-related adjustment processing operation 820.

In the frame rate conversion operation 830, the electronic device may perform at least one operation for adjusting the frame rate for the brightness-adjusted first output image. The frame rate conversion operation 830 may be performed by, e.g., the frame rate conversion component 126 of FIG. 7. The description of FIG. 7 may apply to the description of the frame rate conversion operation by the frame rate conversion component 126.

Through the processing of the frame rate conversion operation 830 described above, the frame rate-converted first output image may be outputted and used for the color-related adjustment processing operation 820.

Figure 11B:
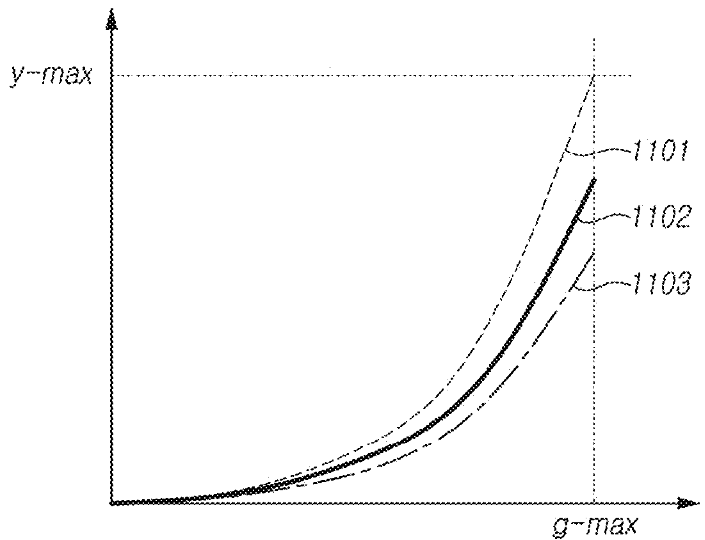
FIG. 11B is a graph illustrating an example brightness adjustment curve used for brightness adjustment according to an embodiment of the disclosure.

FIG. 11A is a flowchart illustrating an example brightness adjustment operation according to an embodiment of the disclosure. FIG. 11B is a graph illustrating an example brightness adjustment curve used for brightness adjustment according to an embodiment of the disclosure.

An electronic device (e.g., the image processing device 1 of FIG. 1 or the display device 200 of FIG. 2) may adjust contrast of an image (e.g., a first output image). Adjustment of contrast may be based on, e.g., a brightness component (e.g., luminance or luma (e.g., Y component of YUV or YCbCr color space)) for a plurality of pixels (e.g., all or some pixels in the image) in the image.

Referring to FIG. 11A, the electronic device may identify contrast adjustment setting information based on the preferred intensity information of the low vision mode (11010). The preferred intensity information may indicate one of the preferred intensities of the low vision mode. The preferred intensity of the low vision mode may be identified, e.g., based on a user input (e.g., a user input to the item 420 of FIG. 4A and the selection options 421, 422, and 423).

Referring to FIG. 11B, a contrast adjustment curve used for contrast adjustment represents a correspondence between gain and brightness. As illustrated in FIG. 11B, in the case of one contrast adjustment curve (e.g., the contrast adjustment curve 1101), the brightness increases as the gain increases. Accordingly, when one contrast adjustment curve is used to adjust the contrast and a gain value of the contrast adjustment curve is set as a parameter for adjusting the contrast, the contrast may be adjusted according to a setting of the gain value according to the preferred intensity of the low vision mode.

The memory 10 or 220 according to an embodiment may include gain values respectively corresponding to the preferred intensities of the low vision mode. For example, the memory 10 or 230 may include a gain value (a first gain value) corresponding to a first preferred intensity (e.g., weak) of the low vision mode, a gain value (a second gain value) corresponding to a second preferred intensity (e.g., medium) of the low vision mode, and a gain value (a third gain value) corresponding to a third preferred intensity (e.g., strong) of the low vision mode. In this case, the gain value may be set to have a greater value as the preferred intensity of the low vision mode becomes stronger (e.g., from weak to strong). For example, the third gain value may be set to a value greater than the first gain value and the second gain value, and the second gain value may be set to a value greater than the first gain value. Accordingly, as the preferred strength becomes stronger, it may be adjusted to have a brighter contrast value.

The electronic device according to an embodiment may identify contrast adjustment setting information including the gain value corresponding to the preferred intensity indicated by the preferred intensity information from the memory 10 or 220, based on the preferred intensity information. For example, when the preferred intensity of the low vision mode is the second preferred intensity (e.g., medium), the electronic device may identify contrast adjustment setting information including the second gain value corresponding to the second preferred intensity.

The electronic device may adjust the contrast of the image based on the contrast adjustment setting information (11020).

According to an embodiment, the electronic device may adjust the brightness for the image based on the gain value corresponding to the preferred intensity of the low vision mode included in the contrast adjustment setting information. For example, the electronic device may adjust the brightness of all or some pixels included in the image to the brightness (e.g., the value of the Y component) corresponding to the gain value included in the contrast adjustment setting information.

In the above-described embodiment, the contrast is adjusted using one contrast adjustment curve, but the disclosure is not limited thereto. For example, a different contrast adjustment curve may be used for each preferred intensity of the low vision mode. For example, the contrast adjustment curve 1101 may be used for contrast adjustment for the third preferred intensity (e.g., strong), the contrast adjustment curve 1102 may be used for contrast adjustment for the second preferred intensity (e.g., medium), and the contrast adjustment curve 1103 may be used for contrast adjustment for the first preferred intensity (e.g., weak). In this case, the gain value may be set to be the same for each preferred intensity, and the contrast adjustment setting information may include information about the contrast adjustment curve (e.g., identification information about the contrast adjustment curve) corresponding to the corresponding preferred intensity.

Figure 12B:
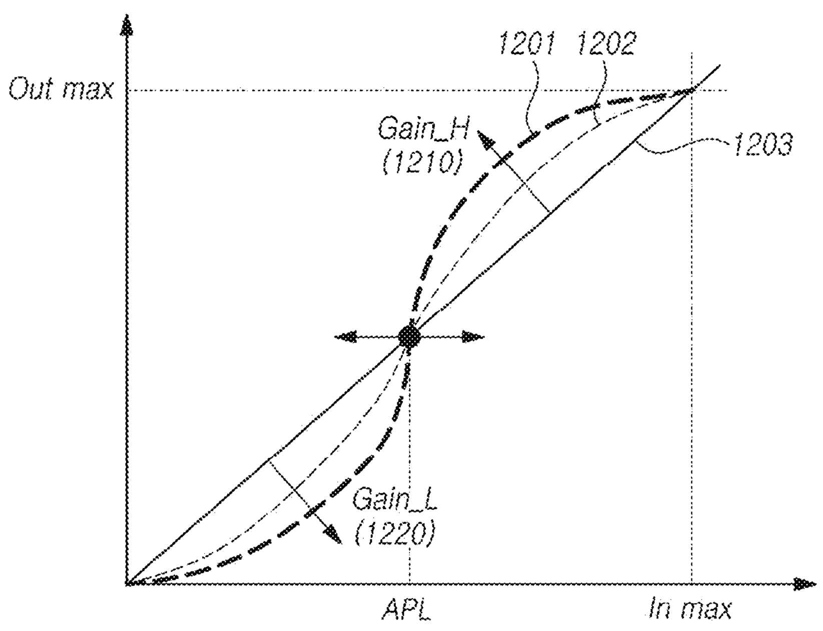
FIG. 12B is a graph illustrating an example dynamic contrast ratio adjustment curve used for dynamic contrast ratio adjustment according to an embodiment of the disclosure.

FIG. 12A is a flowchart illustrating an example dynamic contrast ratio adjustment operation according to an embodiment of the disclosure. FIG. 12B is a graph illustrating an example dynamic contrast ratio adjustment curve used for dynamic contrast ratio adjustment according to an embodiment of the disclosure.

An electronic device (e.g., the image processing device 1 of FIG. 1 or the display device 200 of FIG. 2) may adjust the dynamic contrast ratio of an image (e.g., a first output image). Adjustment of dynamic contrast ratio may be based on, e.g., adjustment of the value of a brightness component (e.g., luminance or luma (e.g., Y component of YUV or YCbCr color space)) for a plurality of pixels (e.g., all or some pixels in the image) in the image.

Referring to FIG. 12A, the electronic device may identify dynamic contrast ratio adjustment setting information based on at least one of preferred intensity information of the low vision mode or at least one additional information (12010).

The preferred intensity information may indicate one of the preferred intensities of the low vision mode. The preferred intensity of the low vision mode may be identified based on a user input (e.g., a user input selecting the item 420 of FIG. 4A and the selection options 421, 422, and 423).

At least one additional information may include, e.g., information about a color specification (e.g., SDR or HDR) and/or information about a variable representing a grayscale characteristic of an image. The variable representing the grayscale characteristic of the image may include, e.g., at least one of an average pixel level (APL), a maximum pixel value, a minimum pixel value, or a histogram of the image.

Referring to FIG. 12B, the dynamic contrast ratio adjustment curve (e.g., an S-shape curve) used for dynamic contrast adjustment represents a correspondence between input brightness and output brightness. As illustrated in FIG. 12B, the dynamic contrast ratio adjustment curve may be associated with two parameters, Gain_H 1210 and Gain_L 1220. In the disclosure, Gain_H 1210 may be referred to as a first gain parameter, and Gain_L 1220 may be referred to as a second gain parameter.

Referring to FIG. 12B, as Gain_H 1210 and Gain_L 1220 increase, the pixel value of the pixel having a pixel value (or brightness value) greater than an APL increases, and the pixel value of the pixel having a pixel value less than the APL decreases, and thus the contrast ratio is enhanced. For example, the dynamic contrast ratio adjustment curve 1201 having Gain_H 1210 and Gain_L 1220, which are larger than the dynamic contrast ratio adjustment curve 1202, may have a greater contrast ratio enhancement effect. Accordingly, when Gain_H 1210 and Gain_L 1220 of the dynamic contrast ratio adjustment curve are set as parameters for contrast adjustment, the dynamic contrast ratio may be adjusted according to the setting of Gain_H 1210 and Gain_L 1220 according to the preferred intensity of the low vision mode.

The memory 10 or 220 according to an embodiment may include values of Gain_H 1210 and Gain_L 1220 corresponding to each preferred intensity of the low vision mode. For example, the memory 10 or 230 may include values of Gain_H 1210 and Gain_L 1220 corresponding to a first preferred intensity (e.g., weak) of the low vision mode, values of Gain_H 1210 and Gain_L 1220 corresponding to a second preferred intensity (e.g., medium) of the low vision mode, and values of Gain_H 1210 and Gain_L 1220 corresponding to a third preferred intensity (e.g., strong) of the low vision mode. In this case, the values of Gain_H 1210 and Gain_L 1220 may be set to have larger values as the preferred intensity of the low vision mode becomes stronger (e.g., from weak to strong). For example, the values of Gain_H 1210 and Gain_L 1220 corresponding to the third preferred intensity may be set to values greater than the values of Gain_H 1210 and Gain_L 1220 corresponding to the first preferred intensity or the second preferred intensity, and the values of Gain_H 1210 and Gain_L 1220 corresponding to the second preferred intensity may be set to values greater than the values of Gain_H 1210 and Gain_L 1220 corresponding to the first preferred intensity. Accordingly, as the preferred strength becomes stronger, it may be adjusted to have a larger contrast ratio.

The electronic device according to an embodiment may identify contrast adjustment setting information including the values of Gain_H 1210 and Gain_L 1220 from the memory 10 or 220, based on the preferred intensity information. For example, when the preferred intensity of the low vision mode is the second preferred intensity (e.g., medium), the electronic device may identify dynamic contrast ratio adjustment setting information including values of Gain_H 1210 and Gain_L 1220 corresponding to the second preferred intensity.

According to an embodiment, the electronic device may identify contrast adjustment setting information including the values of Gain_H 1210 and Gain_L 1220 from the memory 10 or 220, based on the information about the color specification (e.g., SDR or HDR). For example, the values of Gain_H 1210 and Gain_L 1220 applied to the HDR image may be set to be greater than the values of Gain_H 1210 and Gain_L 1220 applied to the SDR image. This is because HDR images generally have a wider grayscale range than SDR images.

According to an embodiment, the values of Gain_H and Gain_L may be a fixed value (e.g., a fixed value in the form of a table) or a function of variables representing grayscale characteristics of an image. The variable representing the grayscale characteristic of the image may include, e.g., at least one of an APL, a maximum pixel value, a minimum pixel value, or a histogram of the image. When a function expressed as a function of a dynamic variable is used to adjust the dynamic contrast ratio, the user may experience visual fatigue. For example, when the difference in contrast ratio is large for each frame or scene, dynamic contrast ratio adjustment using the corresponding function may cause visual fatigue to the user. To prevent and/or reduce this, an infinite impulse response (IIR) method may be used. The IIR method corresponds to a method of calculating and using a variable value used in a previous frame or a previous scene and a variable value used in a current frame or a current scene by the weighted sum.

According to an embodiment, the values of Gain_H 1210 and Gain_L 1220 may be set to the same value.

The electronic device may adjust the contrast of the image based on the dynamic contrast ratio adjustment setting information (12020).

The electronic device according to an embodiment may adjust the dynamic contrast ratio for the image, based on the values of Gain_H 1210 and Gain_L 1220 corresponding to the preferred intensity of the low vision mode included in the dynamic contrast ratio adjustment setting information. For example, the electronic device may adjust the pixel value (or brightness) of each pixel, based on the dynamic contrast ratio adjustment curve corresponding to the values of Gain_H 1210 and Gain_L 1220 included in the dynamic contrast ratio adjustment setting information.

In the above-described embodiment, Gain_H 1210 and Gain_L 1220 are set as parameters for dynamic contrast ratio adjustment, but the disclosure is not limited thereto.

For example, identification information about the dynamic contrast ratio adjustment curves (e.g., the curves 1201, 1202, and 1203) may be set as a parameter for dynamic contrast ratio adjustment. In this case, the dynamic contrast ratio adjustment setting information may include identification information about identifying a dynamic contrast ratio adjustment curve corresponding to a corresponding preferred intensity. In this case, the electronic device may adjust the pixel value (or brightness), based on the dynamic contrast ratio adjustment curve corresponding to the preferred intensity of the low vision mode included in the dynamic contrast ratio adjustment setting information.

Figure 13B:
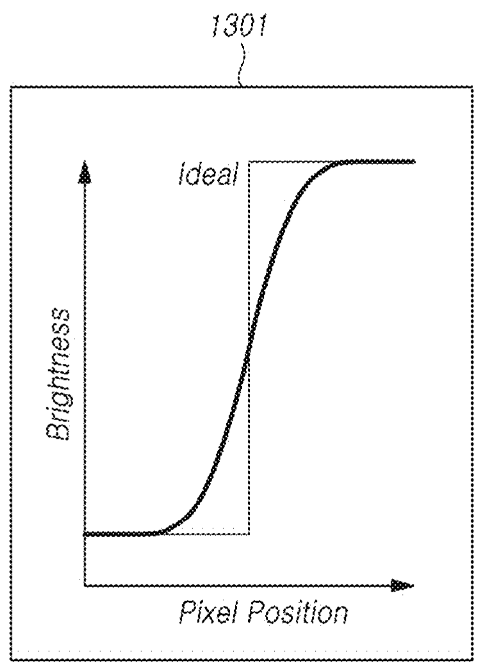
FIG. 13B includes graphs illustrating an example sharpness adjustment method according to an embodiment of the disclosure.
Figure 13B:
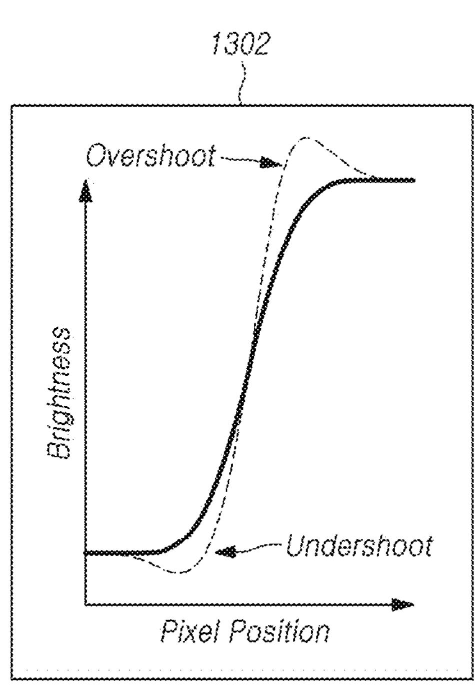
Figure 13C:
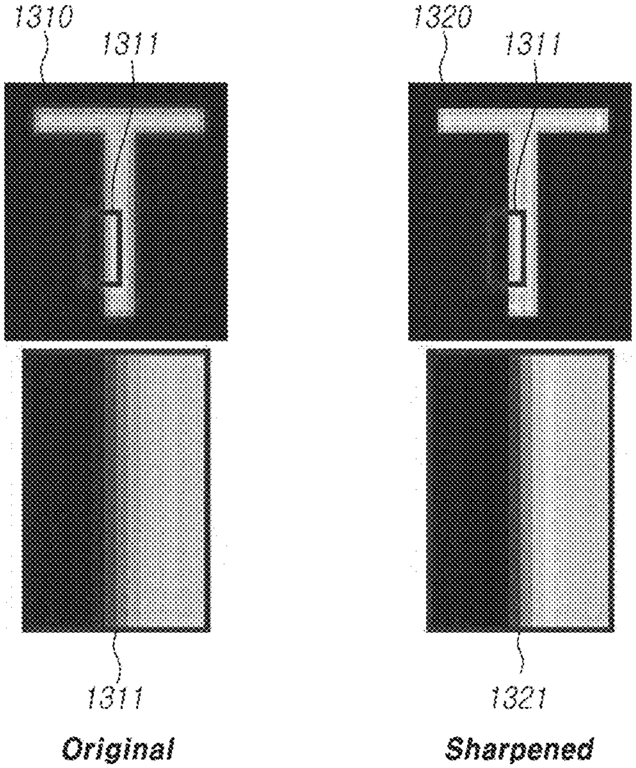
FIG. 13C is a diagram illustrating an effect of sharpness adjustment according to an embodiment of the disclosure.

FIG. 13A is a flowchart illustrating an example sharpness adjustment operation according to an embodiment of the disclosure. FIG. 13B includes graphs illustrating an example sharpness adjustment method according to an embodiment of the disclosure. FIG. 13C is a diagram illustrating an effect of sharpness adjustment according to an embodiment of the disclosure.

An electronic device (e.g., the image processing device 1 of FIG. 1 or the display device 200 of FIG. 2) may adjust contrast of an image (e.g., a first output image). Adjustment of sharpness may be based on, e.g., a brightness component (e.g., luminance or luma (e.g., Y component of YUV or YCbCr color space)) for a plurality of pixels (e.g., a preset number of pixels adjacent to the edge) adjacent to the edge in the image.

Referring to FIG. 13A, the electronic device may identify sharpness adjustment setting information based on the preferred intensity information of the low vision mode (13010). The preferred intensity information may indicate one of the preferred intensities of the low vision mode. The preferred intensity of the low vision mode may be identified based on a user input (e.g., a user input selecting the item 420 of FIG. 4A and the selection options 421, 422, and 423).

Referring to FIG. 13B, it is ideal to adjust sharpness around the edge using, e.g., a step function as shown in 1301. However, since such adjustment is generally difficult to achieve, an overshoot/undershoot method may be used as shown in 1302. As illustrated in 1302, when the overshoot/undershoot method is applied, the electronic device may increase the pixel value (or brightness) by applying overshoot to pixels (e.g., pixels belonging to the inside of the object) belonging to or associated with a first area among pixels adjacent to the edge and may decrease the pixel value (or brightness) by applying undershoot to pixels (e.g., pixels belonging to the outside (e.g., background) of the object) belonging to or associated with a second area among the pixels adjacent. Accordingly, sharpness around the edge may be increased. For example, as illustrated in FIG. 13C, the sharpness of the edge portion 1321 of the image 1310 to which the sharpness adjustment is applied may be higher than the sharpness of the edge portion 1311 of the image 1310 before the sharpness adjustment is applied. The number of pixels adjacent to the edge may be preset. For example, in one axis parallel to the x-axis of the pixel area, ten pixels including five pixels belonging to the first area and five pixels belonging to the second area may be set as pixels adjacent to the edge.

Therefore, when the intensity (or degree) of overshooting/undershooting is set as a parameter for adjusting sharpness, sharpness may be adjusted according to the preferred intensity of the low vision mode.

The memory 10 or 220 according to an embodiment may include information about the intensity of overshooting/undershooting corresponding to each preferred intensity of the low vision mode. For example, the memory 10 or 230 may include an intensity (first intensity) of overshooting/undershooting corresponding to a first preferred intensity (e.g., weak) of the low vision mode, an intensity (second intensity) of overshooting/undershooting corresponding to a second preferred intensity (e.g., medium) of the low vision mode, and an intensity (third intensity) of overshooting/undershooting corresponding to a third preferred intensity (e.g., strong) of the low vision mode. In this case, the intensity value of overshooting/undershooting may be set to have a greater value as the preferred intensity of the low vision mode becomes stronger (e.g., from weak to strong). For example, the third intensity value may be set to a value greater than the first intensity value and the second intensity value, and the second intensity value may be set to a value greater than the first intensity value. Accordingly, as the preferred intensity increases, it may be adjusted to have a greater sharpness value. According to an embodiment, the intensity of the overshoot and the intensity of the undershoot may be set differently.

The electronic device according to an embodiment may identify sharpness adjustment setting information including the intensity value of overshooting/undershooting corresponding to the preferred intensity indicated by the preferred intensity information from the memory 10 or 220, based on the preferred intensity information. For example, when the preferred intensity of the low vision mode is the second preferred intensity, the electronic device may identify the sharpness adjustment setting information including the second intensity value corresponding to the second preferred intensity.

The electronic device may adjust the sharpness of the image according to the sharpness adjustment setting information (11020).

According to an embodiment, the electronic device may adjust the brightness difference between adjacent pixels around the edge in the image based on the intensity value of the overshooting/undershooting corresponding to the preferred intensity of the low vision mode included in the sharpness adjustment setting information.

In the above-described embodiment, the intensity value of overshooting/undershooting is described as a setting value for adjusting sharpness but is not limited thereto.

For example, the electronic device may adjust the sharpness of the image using at least one image/video enhancement technology. Image/video enhancement technology may be classified into a method for pixel domain processing or a method for frequency domain processing. Image/video enhancement methods may include, but are not limited to, de-noising, sharpening, unsharp masking, contrast-based enhancement, HDR-based enhancement, edge aware/preserving filtering, multiscale image decomposition, and/or contrast expansion/compression.

Figure 14:
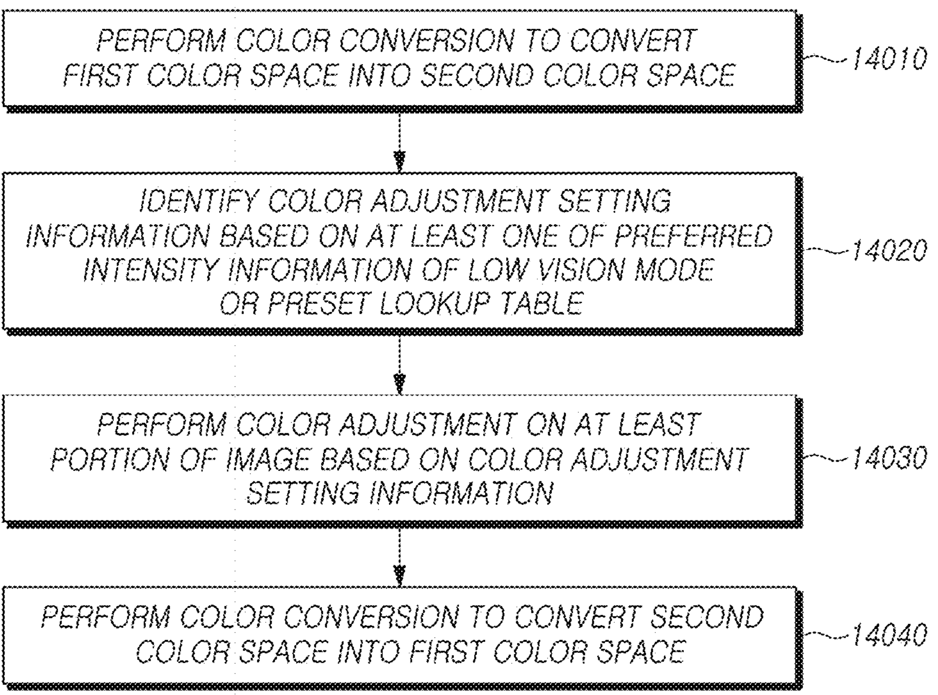
FIG. 14 is a flowchart illustrating an example sharpness adjustment operation according to an embodiment of the disclosure.

FIG. 14 is a flowchart illustrating an example color adjustment operation according to an embodiment of the disclosure.

An electronic device (e.g., the image processing device 1 of FIG. 1 or the display device 200 of FIG. 2) may adjust the color of an image (e.g., a first output image). The color adjustment may be based on, e.g., adjustment of a color component (e.g., saturation component of the hue, saturation, value (HSV) or hue, saturation, lightness (HSL) color space) of a plurality of pixels (e.g., pixels included in the entire image or a portion of the image) included in the image.

Referring to FIG. 14, the electronic device may perform color conversion for converting the first color space into the second color space (14010). According to an embodiment, when the color space of the image is a first color space that does not include the saturation component, the electronic device may perform color conversion to convert the first color space into the second color space that includes the saturation component. The first color space that does not include the saturation component may be, e.g., an RGB, YUV, or YCbCr color space. The second color space including the saturation component may be, e.g., an HSV or HSL color space.

Color conversion may be performed based on a standardized conversion technique. For example, the following equation may be used for color conversion from the RGB color space to the HSV color space.

$$\text{Min} = \text{MIN}(R, G, B),\ \text{Max} = \text{MAX}(R, G, B) \qquad \text{[Equation 1]}$$

$$\begin{aligned}\text{Hue} &= 60^\circ X(G-B)/(\text{Max}-\text{Min}) \quad \text{(when Max is Red)}\\ &= 60^\circ X(B-R)/(\text{Max}-\text{Min}) \quad \text{(when Max is Green)}\\ &= 60^\circ X(R-G)/(\text{Max}-\text{Min}) \quad \text{(when Max is Blue)}\end{aligned}$$

$$\text{Saturation} = (\text{Max}-\text{Min})/\text{Min}$$

$$\text{Value} = \text{Max}$$

The electronic device may identify color adjustment setting information based on at least one of preferred intensity information of the low vision mode or a preset lookup table (14020). The electronic device may perform color adjustment on at least a portion of the image based on the color adjustment setting information (14030).

For example, the electronic device may identify color adjustment setting information including the weight value corresponding to the preferred intensity indicated by the preferred intensity information, based on the preferred intensity information of the low vision mode. The memory 10 or 220 according to an embodiment may include weight values respectively corresponding to the preferred intensities of the low vision mode. The electronic device may obtain the adjusted saturation value by multiplying, dividing, adding, or subtracting the saturation value of each pixel by/to/from the weight value included in the color adjustment setting information. Each weight value may be set to be adjusted to have a higher saturation value as the preferred intensity increases (e.g., from weak to strong).

For example, the electronic device may identify color adjustment setting information based on a preset lookup table. The lookup table may include preset setting values according to external conditions. The external conditions may include, e.g., a screen mode, viewing brightness, and/or user selection information. The electronic device may identify the external condition and identify color adjustment setting information including setting values corresponding to the external condition identified from the lookup table. The electronic device may obtain the adjusted saturation value using the setting values included in the color adjustment setting information.

For example, the electronic device may identify the color adjustment setting information including the weight value corresponding to the preferred intensity indicated by the preferred intensity information and the setting values corresponding to the external condition identified from the lookup table, based on the preferred intensity of the low vision mode and the preset lookup table. For example, the electronic device may change the saturation value of each pixel using the setting value obtained from the lookup table and may obtain a new saturation value by applying a weight value to the changed saturation value.

According to an embodiment, the electronic device may apply the same color adjustment setting (e.g., a weight value according to the preferred intensity of the low vision mode or a setting value according to the lookup table) to the entire image (e.g., each pixel included in the entire image). Accordingly, the saturation of the entire image may be changed, and visibility may be enhanced.

However, in the case of a portion of a specific object of the image, when the saturation is increased in the same manner as other portions of the image, the visibility of the user with low vision may be reduced. For example, in the case of an object such as a face, when saturation is increased, the skin color becomes red, and visibility may be reduced. Therefore, it is necessary to consider a method of applying different saturation adjustment settings for each part of the image. Accordingly, it is possible to selectively adjust the saturation of a specific object (e.g., face) in the image. This is described in greater detail below with reference to FIG. 15.

The electronic device may perform color conversion to convert the second color space into the first color space (14040). For example, when color conversion is performed from the RGB color space to the HSV color space and saturation adjustment is performed, the electronic device may convert the HSV color space back into the RGB color space. Accordingly, the color space may be converted into the original color space. Thereafter, the electronic device may perform subsequent processing in the original color space.

Figure 15:
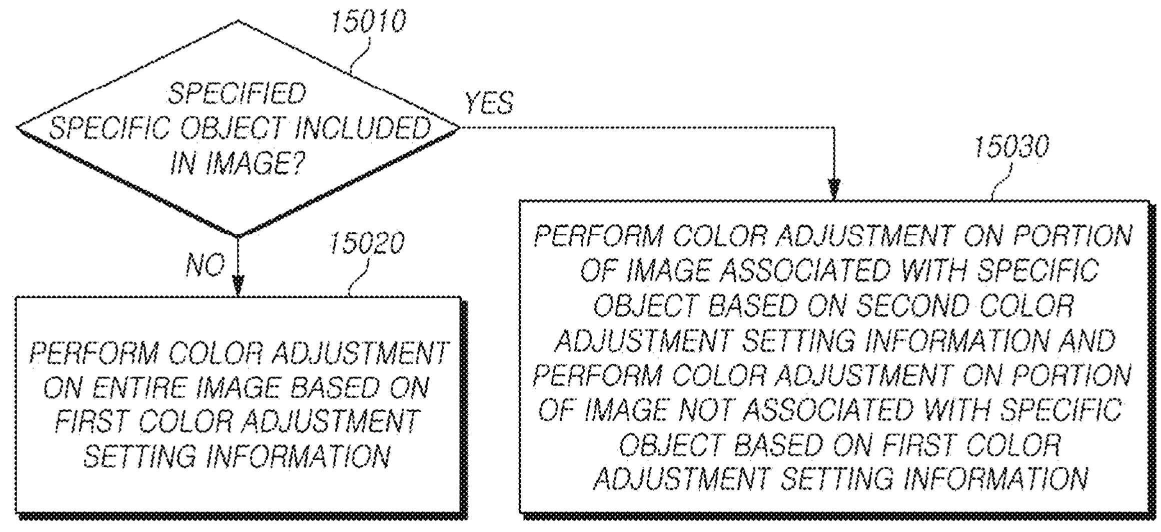
FIG. 15 is a flowchart illustrating an example sharpness adjustment operation according to an embodiment of the disclosure.

FIG. 15 is a flowchart illustrating an example color adjustment operation according to an embodiment of the disclosure.

An electronic device (e.g., the image processing device 1 of FIG. 1 or the display device 200 of FIG. 2) may adjust the color of an image (e.g., a first output image). The color adjustment may be based on, e.g., adjustment of a color component (e.g., saturation component of the hue, saturation, value (HSV) or hue, saturation, lightness (HSL)color space) of a plurality of pixels (e.g., pixels included in the entire image or a portion of the image) included in the image.

Referring to FIG. 15, the electronic device may identify whether a specified specific object is included in the image (15010). The specified specific object may be, e.g., a face or text.

When the specified specific object is not included in the image, the electronic device may perform color adjustment on the entire image based on the first color adjustment setting information (15020). For example, the electronic device may perform saturation adjustment on each pixel included in the entire image, based on the first color adjustment setting information. The description of FIG. 14 may apply to the description of the saturation adjustment.

When the specified specific object is included in the image, the electronic device may perform color adjustment on a portion of the image associated with the specific object based on the second color adjustment setting information and may perform color adjustment on a portion of the image not associated with the specific object based on the first color adjustment setting information (15030). For example, the electronic device may perform saturation adjustment on each pixel included in a portion of the image associated with the specific object based on the second color adjustment setting information and may perform color adjustment on each pixel included in a portion of the image not associated with the specific object based on the first color adjustment setting information.

The first color adjustment setting information, according to an embodiment, may be color adjustment setting information (e.g., color adjustment setting information stored in the memory 10 or 220) configured based on at least one of the preferred intensity of the low vision mode or the lookup table. The second color adjustment setting information may be color adjustment setting information different from the first color adjustment setting information and may include, e.g., a color adjustment setting for setting a saturation adjustment value lower than the saturation adjustment value according to the first color adjustment setting information.

Figure 16:
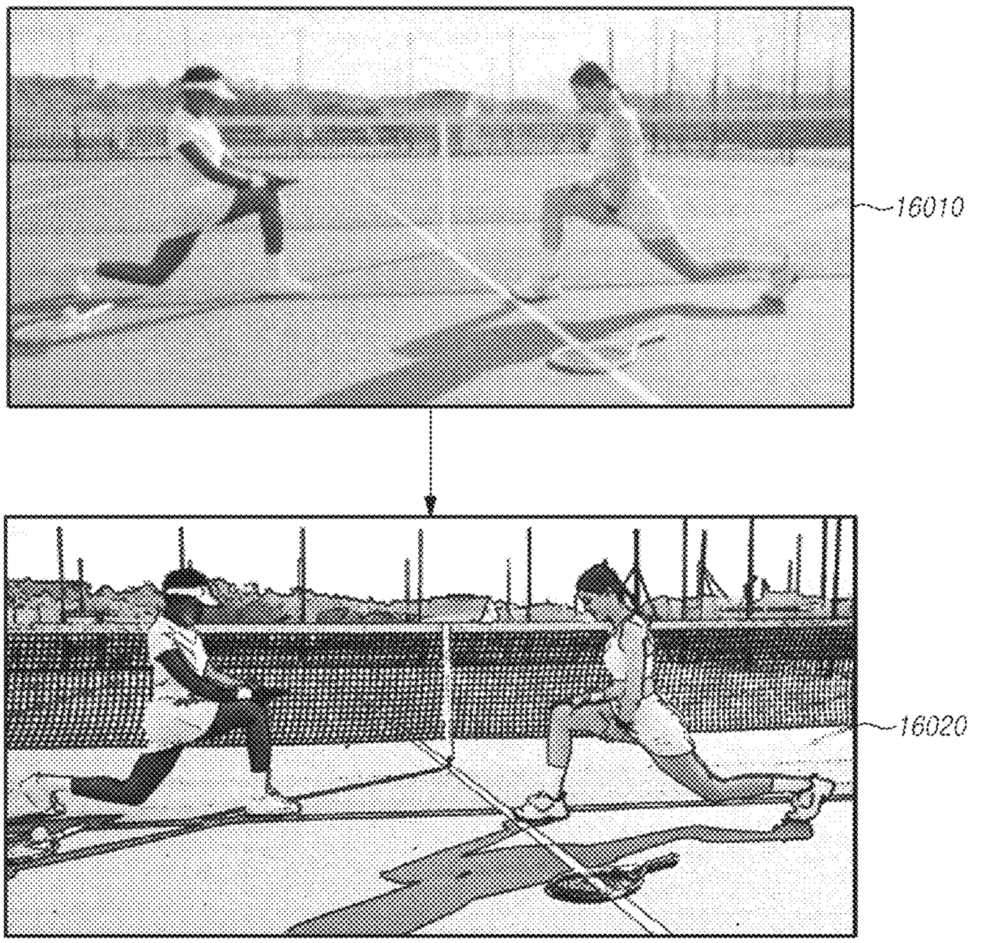
FIG. 16 is a diagram illustrating an example effect of image processing according to an embodiment of the disclosure.

FIG. 16 is a diagram illustrating an example effect of image processing according to an embodiment of the disclosure.

Referring to FIG. 16, it may be identified that an image 16020 output by sequentially performing an edge adjustment processing operation (e.g., the edge adjustment processing operation 310 of FIG. 3) and an image quality adjustment processing operation (e.g., the image quality adjustment processing operation 310 of FIG. 3) of the disclosure has enhanced visibility as compared to an input image 16010. Further, it may be identified that the output image 16020 has an effect of enhancing the image quality at the center of the edge as compared to the input image 16010.

Figure 17:
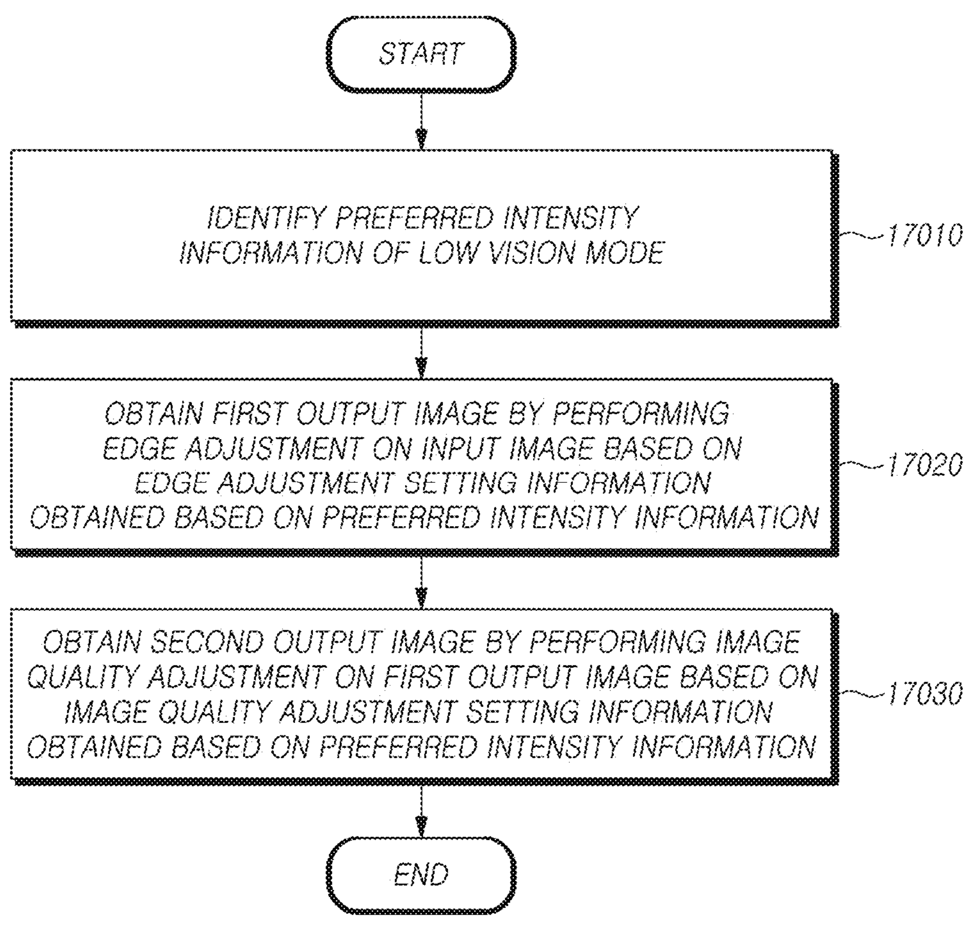
FIG. 17 is a flowchart illustrating an example method for operating a display device according to an embodiment of the disclosure.

FIG. 17 is a flowchart illustrating an example method for operating a display device according to an embodiment of the disclosure.

Referring to FIG. 17, a display device (e.g., the display device 200 of FIG. 2) may identify preferred intensity information of a low vision mode (17010). According to an embodiment, a display device may identify preferred intensity information indicating a first preferred intensity among a plurality of preferred intensities associated with image processing based on a low vision mode for a user having low vision, based on a user input.

The display device may obtain a first output image by performing edge adjustment on input image based on edge adjustment setting information obtained from preferred intensity information (17020). According to an embodiment, the display device may obtain edge thickness setting information corresponding to the first preferred intensity from the memory and perform thickness adjustment on the thickness of the edge for the input image based on the obtained edge thickness setting information.

The display device may obtain a second output image by performing image quality adjustment on first output image based on image quality adjustment setting information obtained based on preferred intensity information (17030). According to an embodiment, the display device may obtain image quality adjustment setting information corresponding to the first preferred intensity from the memory and perform image quality adjustment (image quality adjustment processing) on the image on which the edge thickness adjustment is performed, based on the obtained image quality adjustment setting information. The image on which image quality adjustment is performed may then be displayed through the display.

According to an embodiment, the memory may include edge thickness setting information corresponding to each of the plurality of preferred intensities and image quality adjustment setting information corresponding to each of the plurality of preferred intensities. According to an embodiment, each image quality adjustment setting information may include setting information for adjusting at least one of a brightness, a dynamic contrast ratio, a sharpness, or a color for the image according to a corresponding preferred intensity.

According to an embodiment, the display device may identify preferred color information indicating a first color among a plurality of preferred colors associated with image processing based on the low vision mode, based on a user input, obtain edge color setting information corresponding to the first preferred color from the memory and perform color adjustment (color adjustment processing) on the edge for the input image, based on the obtained edge color setting information. According to an embodiment, the memory may further include edge color setting information corresponding to each of the plurality of preferred intensities.

According to an embodiment, the display device may adjust a sharpness for the image by increasing brightness by applying overshoot to pixels belonging to a first area among pixels adjacent to the edge and by decreasing brightness by applying undershoot to pixels belonging to a second area different from the first area, based on setting information for adjusting the sharpness according to the first preferred intensity included in the obtained image quality adjustment setting information. According to an embodiment, the first area may correspond to an inner area of the object associated with the edge, and the second area may correspond to an outer area of the object.

According to an embodiment, the display device may adjust a dynamic contrast ratio for the image, based on setting information for adjusting a dynamic contrast ratio according to the first preferred intensity included in the obtained image quality adjustment setting information. According to an embodiment, the setting information may be associated with an S-type curve representing a correlation (or, a correspondence) between an input brightness and an output brightness and include a first setting value for adjusting a pixel value for pixels having a pixel value larger than an average pixel level of the input image and a second setting value for adjusting a pixel value for pixels having a pixel value smaller than the average pixel level. According to an embodiment, the first setting value and the second setting value may be set based on at least one of the first preferred intensity, information about a color specification, a minimum pixel value, a maximum pixel value, or a histogram.

According to an embodiment, the display device may adjust a contrast for each pixel included in the image, based on the setting information for adjusting a contrast according to the first preferred intensity included in the obtained image quality adjustment setting information.

According to an embodiment, the display device may perform color conversion to convert a first color space into a second color space including a saturation component after adjusting the sharpness for the image, perform color adjustment on at least a portion of the image, based on setting information for adjusting a color according to the first preferred intensity included in the obtained image quality adjustment setting information, and perform color conversion to convert the second color space into the first color space.

According to an embodiment, the display device may identify whether the image includes a specified specific object and if the image does not include the specified specific object, perform color adjustment processing on each pixel included in the entire image, based on setting information for adjusting a color according to the first preferred intensity. If the image includes the specified specific object, the display device may perform color adjustment on each pixel included in a portion of the image, not associated with the specific object, based on the setting information for adjusting the color according to the first preferred intensity and perform color adjustment on each pixel included in a portion of the image, associated with the specific object, based on second setting information for adjusting the color different from the setting information for adjusting the color according to the first preferred intensity.

As described above, the display device according to the disclosure may comprehensively and simultaneously perform a plurality of image quality adjustments (e.g., sharpness, dynamic contrast ratio, contrast ration, and color adjustments) together with edge thickness adjustment, according to the preferred intensity based on a user input, thereby providing an effect of enhancing visibility and image quality (multiple effects) suited for the user's preference only with a mere user selection.

According to an embodiment, the display device may remove an artifact included in the image on which the edge thickness adjustment is performed, according to the first preferred intensity, using a trained AI model. According to an embodiment, the AI model may be trained to reduce artifacts included in the image in which the thickness of the edge is adjusted according to each preferred intensity.

According to an embodiment, the display device may display selection information for guiding to select one from among a plurality of preferred intensities.

In the above-described specific embodiments, the components included in the disclosure are represented in singular or plural forms depending on specific embodiments. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been illustrated and described with reference to various example embodiments, it will be understood that the various example embodiments are intended to be illustrative, not limiting. It will be further understood by those skilled in the art, that various changes may be made thereto without departing from the scope of the disclosure, including the appended claims and their equivalents. It will also be understood that any of the embodiment (s) described herein may be used in conjunction with any other embodiment(s) described herein.

What is claimed is:

1. A display device, comprising:

memory storing a program including at least one instruction; and at least one processor, comprising processing circuitry, connected to the memory and configured to execute the at least one instruction of the program stored in the memory, wherein at least one processor, individually and/or collectively, is configured to:

identify preferred intensity information indicating a first preferred intensity among a plurality of preferred intensities associated with image processing based on a low vision mode, based on an input;

perform edge thickness adjustment processing on an input image based on edge thickness setting information corresponding to the first preferred intensity;

perform image quality adjustment processing on the image on which the edge thickness adjustment processing is performed, based on image quality adjustment setting information corresponding to the first preferred intensity; and adjust a sharpness for the image by increasing brightness by applying overshoot to pixels belonging to a first area among pixels adjacent to the edge and by decreasing brightness by applying undershoot to pixels belonging to a second area different from the first area, based on setting information for adjusting the sharpness according to the first preferred intensity included in the obtained image quality adjustment setting information, wherein the first area corresponds to an inner area of an object associated with the edge, and the second area corresponds to an outer area of the object, wherein the memory includes edge thickness setting information corresponding to each of the plurality of preferred intensities and image quality adjustment setting information corresponding to each of the plurality of preferred intensities, and wherein each image quality adjustment setting information includes setting information for adjusting at least one of a brightness, a dynamic contrast ratio, a sharpness, or a color for the image according to a corresponding preferred intensity.

2. The display device of claim 1, wherein adjusting the edge thickness includes adjusting the edge to at least one object meeting a preset condition among a plurality of objects to be relatively thicker than an edge corresponding to the remaining objects.

3. The display device of claim 1, wherein at least one processor, individually and/or collectively, is configured to:

perform color conversion to convert a first color space into a second color space including a saturation component based on adjusting the sharpness for the image;

perform color adjustment on at least a portion of the image, based on setting information for adjusting a color according to the first preferred intensity included in the obtained image quality adjustment setting information; and perform color conversion to convert the second color space into the first color space.

4. The display device of claim 3, wherein at least one processor, individually and/or collectively, is configured to:

identify whether the image includes a specified specific object;

based on the image not including the specified specific object, perform color adjustment processing on each pixel included in an entire image, based on setting information for adjusting a color according to the first preferred intensity; and based on the image including the specified specific object, perform color adjustment on each pixel included in a portion of the image, not associated with the specific object, based on the setting information for adjusting the color according to the first preferred intensity, and perform color adjustment processing on each pixel included in a portion of the image, associated with the specific object, based on second setting information for adjusting the color different from the setting information for adjusting the color according to the first preferred intensity.

5. The display device of claim 1, wherein at least one processor, individually and/or collectively, is configured to:

identify preferred color information indicating a first color among a plurality of preferred colors associated with image processing based on the low vision mode, based on an input; and obtain edge color setting information corresponding to the first color from the memory, and perform edge color adjustment processing on the input image based on the obtained edge color setting information, wherein the memory further includes edge color setting information corresponding to each of the plurality of preferred intensities.

6. The display device of claim 5, wherein at least one processor, individually and/or collectively, is configured to adjust a contrast for each pixel included in the image, based on setting information for adjusting a contrast according to the first preferred intensity included in the obtained image quality adjustment setting information.

7. The display device of claim 5, wherein at least one processor, individually and/or collectively, is configured to remove an artifact included in the image on which the edge thickness adjustment processing is performed according to the first preferred intensity, using a trained artificial intelligence model, and wherein the artificial intelligence model is trained to reduce an artifact included in the image on which the edge thickness adjustment processing is performed according to each preferred intensity.

8. The display device of claim 5, wherein at least one processor, individually and/or collectively, is configured to display selection information for guiding selection of one from among the plurality of preferred intensities.

9. A display device, comprising:

memory storing a program including at least one instruction; and at least one processor, comprising processing circuitry, connected to the memory and configured to execute the at least one instruction of the program stored in the memory, wherein at least one processor, individually and/or collectively, is configured to:

identify preferred intensity information indicating a first preferred intensity among a plurality of preferred intensities associated with image processing based on a low vision mode, based on an input;

perform edge thickness adjustment processing on an input image based on edge thickness setting information corresponding to the first preferred intensity;

perform image quality adjustment processing on the image on which the edge thickness adjustment processing is performed, based on image quality adjustment setting information corresponding to the first preferred intensity; and adjust a dynamic contrast ratio for the image, based on setting information for adjusting a dynamic contrast ratio according to the first preferred intensity included in the obtained image quality adjustment setting information, and wherein the memory includes edge thickness setting information corresponding to each of the plurality of preferred intensities and image quality adjustment setting information corresponding to each of the plurality of preferred intensities, wherein each image quality adjustment setting information includes setting information for adjusting at least one of a brightness, a dynamic contrast ratio, a sharpness, or a color for the image according to a corresponding preferred intensity, and wherein the setting information is associated with an S-type curve representing a correlation between an input brightness and an output brightness and includes a first setting value for adjusting a pixel value for pixels having a pixel value larger than an average pixel level of the input image and a second setting value for adjusting a pixel value for pixels having a pixel value smaller than the average pixel level.

10. The display device of claim 9, wherein the first setting value and the second setting value are set based on at least one of the first preferred intensity, information about a color specification, a minimum pixel value, a maximum pixel value, or a histogram.

11. A method of operating a display device, the method comprising:

identifying preferred intensity information indicating a first preferred intensity among a plurality of preferred intensities associated with image processing based on a low vision mode, based on an input;

performing edge thickness adjustment processing on an input image based on edge thickness setting information corresponding to the first preferred intensity;

performing image quality adjustment processing on the image on which the edge thickness adjustment processing is performed, based on image quality adjustment setting information corresponding to the first preferred intensity; and adjusting a sharpness for the image by increasing brightness by applying overshoot to pixels belonging to a first area among pixels adjacent to the edge and by decreasing brightness by applying undershoot to pixels belonging to a second area different from the first area, based on setting information for adjusting the sharpness according to the first preferred intensity included in the obtained image quality adjustment setting information, wherein the first area corresponds to an inner area of an object associated with the edge, and the second area corresponds to an outer area of the object, wherein memory includes edge thickness setting information corresponding to each of the plurality of preferred intensities and image quality adjustment setting information corresponding to each of the plurality of preferred intensities, and wherein each image quality adjustment setting information includes setting information for adjusting at least one of a brightness, a dynamic contrast ratio, a sharpness, or a color for the image according to a corresponding preferred intensity.

12. The method of claim 11, wherein adjusting the edge thickness includes adjusting the edge to at least one object meeting a preset condition among a plurality of objects to be relatively thicker than an edge corresponding to the remaining objects.

13. The method of claim 12, wherein performing the image quality adjustment processing further includes:

performing color conversion to convert a first color space into a second color space including a saturation component based on adjusting the sharpness for the image;

performing color adjustment on at least a portion of the image, based on setting information for adjusting a color according to the first preferred intensity included in the obtained image quality adjustment setting information; and performing color conversion to convert the second color space into the first color space.

14. The method of claim 13, wherein performing the color adjustment processing on the at least the portion includes:

identifying whether the image includes a specified specific object;

based on the image not including the specified specific object, performing color adjustment processing on each pixel included in an entire image, based on setting information for adjusting a color according to the first preferred intensity; and based on the image including the specified specific object, performing color adjustment on each pixel included in a portion of the image, not associated with the specific object, based on the setting information for adjusting the color according to the first preferred intensity, and performing color adjustment on each pixel included in a portion of the image, associated with the specific object, based on second setting information for adjusting the color different from the setting information for adjusting the color according to the first preferred intensity.

15. The method of claim 11, wherein performing the image quality adjustment processing further includes adjusting a dynamic contrast ratio for the image, based on setting information for adjusting a dynamic contrast ratio according to the first preferred intensity included in the obtained image quality adjustment setting information, and wherein the setting information is associated with an S-type curve representing a correlation between an input brightness and an output brightness and includes a first setting value for adjusting a pixel value for pixels having a pixel value larger than an average pixel level of the input image and a second setting value for adjusting a pixel value for pixels having a pixel value smaller than the average pixel level.

16. The method of claim 15, wherein the first setting value and the second setting value are set based on at least one of the first preferred intensity, information about a color specification, a minimum pixel value, a maximum pixel value, or a histogram.

17. The method of claim 11, further comprising:

identifying preferred color information indicating a first color among a plurality of preferred colors associated with image processing based on the low vision mode, based on an input; and obtaining edge color setting information corresponding to the first color from the memory, and performing edge color adjustment on the input image based on the obtained edge color setting information, wherein the memory further includes edge color setting information corresponding to each of the plurality of preferred intensities.

18. The method of claim 17, wherein performing the image quality adjustment processing further includes adjusting a contrast for each pixel included in the image, based on setting information for adjusting a contrast according to the first preferred intensity included in the obtained image quality adjustment setting information.

19. The method of claim 17, further comprising removing an artifact included in the image on which the edge thickness adjustment processing is performed according to the first preferred intensity, using a trained artificial intelligence model, wherein the artificial intelligence model is trained to reduce an artifact included in the image on which the edge thickness adjustment processing is performed according to each preferred intensity.

20. The method of claim 17, further comprising displaying selection information for guiding selection of one from among the plurality of preferred intensities.

* * * * *